(12) United States Patent
Tang et al.

(10) Patent No.: US 12,073,581 B2
(45) Date of Patent: *Aug. 27, 2024

(54) ADAPTIVE FACE DEPTH IMAGE GENERATION

(71) Applicant: Ambarella International LP, Santa Clara, CA (US)

(72) Inventors: Jian Tang, Shanghai (CN); Tao Liu, Shanghai (CN); Jingyang Qiu, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,363

(22) Filed: Sep. 28, 2023

(65) Prior Publication Data

US 2024/0029285 A1 Jan. 25, 2024

Related U.S. Application Data

(63) Continuation of application No. 17/694,726, filed on Mar. 15, 2022, now Pat. No. 11,880,992.

(30) Foreign Application Priority Data

Feb. 28, 2022 (CN) .......................... 202210206183.7

(51) Int. Cl.
*G06T 7/586* (2017.01)
*G06T 3/40* (2024.01)
*H04N 7/01* (2006.01)

(52) U.S. Cl.
CPC ............... *G06T 7/586* (2017.01); *G06T 3/40* (2013.01); *H04N 7/0117* (2013.01); *G06T 2207/30201* (2013.01)

(58) Field of Classification Search
CPC .......... G06T 2207/10016; G06T 2207/30201; G06T 3/40; G06T 7/521; G06T 7/586;
(Continued)

(56) References Cited

U.S. PATENT DOCUMENTS 11,880,992 B2 * 1/2024 Tang ..................... G06V 40/166
2018/0196998 A1 * 7/2018 Price ....................... H04N 23/11
2018/0336737 A1 * 11/2018 Varady .................... G06T 7/536

* cited by examiner

*Primary Examiner* — Christopher S Kelley
*Assistant Examiner* — Ana Picon-Feliciano
(74) *Attorney, Agent, or Firm* — Maiorana Patent Law, PA

(57) ABSTRACT

An apparatus comprising an interface, a light projector and a processor. The interface may be configured to receive pixel data. The light projector may be configured to generate a structured light pattern. The processor may be configured to process the pixel data arranged as video frames comprising the structured light pattern, perform computer vision operations to detect a size of a face area of the video frames, determine a scale ratio in response to the size of the face area, extract the structured light pattern from the video frames, generate a downscaled structured light image and generate a depth map in response to the downscaled structured light image and a downscaled reference image. A downscale operation may be performed in response to the scale ratio to generate the downscaled structured light image. The scale ratio may enable the generation of the downscaled structured light image with sufficient depth pixels.

20 Claims, 13 Drawing Sheets

(58) Field of Classification Search
CPC .... G06V 10/145; G06V 40/166; G06V 40/45; H04N 7/0117
USPC ......................................................... 348/42
See application file for complete search history.

ADAPTIVE FACE DEPTH IMAGE GENERATION

This application relates to U.S. patent application Ser. No. 17/694,726, filed on Mar. 15, 2022, which relates to China Patent Application No. 202210206183.7, filed on Feb. 28, 2022. Each of the mentioned applications are hereby incorporated by reference in its entirety.

FIELD OF THE INVENTION

The invention relates to computer vision generally and, more particularly, to a method and/or apparatus for implementing adaptive face depth image generation.

BACKGROUND

There has been a rapid development in machine vision, optical technology, and artificial intelligence. Three-dimensional (3D) reconstruction has become an important branch of machine vision due to advancements in robotics and deep learning technology. Conventional 3D reconstruction technology has problems for real-time applications. The speed of 3D reconstruction is not fast enough and the accuracy of the 3D reconstruction is not accurate enough.

There are mainly two types of methods of 3D reconstruction based on machine vision, active vision methods and passive vision methods. Active vision methods include time-of-flight method, structured light method, holographic interferometry, moiré method, etc. Passive vision methods include binocular stereo vision, motion vision, defocusing method, shading method, focusing method, etc.

One method of active 3D reconstruction is performed using a monocular speckle structured light system to generate depth maps. Due to the lack of speed and accuracy of the 3D reconstruction, applications are generally limited to scenarios that do not require high accuracy, such as three-dimensional face recognition and face liveness detection.

The speed of depth map generation using structured light is strongly correlated to depth map resolution. Depth map calculations generally use a block match method. Calculation time for depth maps using block matching is linearly proportional to the input size of structured light image. Therefore, depth map calculations on a large face area (i.e., 500×500 pixels) will spend 25 times as long compared to the depth map calculations on a smaller face area (i.e., 100×100 pixels).

Larger face areas usually result when a face is captured close to the camera sensor and smaller face areas usually result when a face is captured farther away from the camera sensor. For example, if a face is 0.3 meters away from a 1920×1080 camera, the face area could include as many as 0.5 Megapixels. Performing the calculations to generate a depth map for a face area of 0.5 Megapixels can take around hundreds of milliseconds. A calculation time of hundreds of milliseconds is unacceptable in real-life products. On the other hand, performing the calculations to generate a depth map of a tiny face area only takes a few milliseconds. The inconsistent performance on different sizes of face areas is an issue in product development and user experience. The calculation speed varies dramatically depending on the face areas. Moreover, the face depth map in various resolutions becomes a problem for liveness algorithm training.

Liveness detection algorithms are implemented with a range of required number of depth information for distinguishing a real face from a fake face. A large face area that provides a large amount of depth information can exceed the input needs for liveness detection, which results in unnecessary calculations. The unnecessary calculations increase the time for creating depth maps and raises the workload of not only depth map calculation but also on the overall liveness detection.

It would be desirable to implement adaptive face depth image generation.

SUMMARY

The invention concerns an apparatus comprising an interface, a structured light projector and a processor. The interface may be configured to receive pixel data. The structured light projector may be configured to generate a structured light pattern. The processor may be configured to process the pixel data arranged as video frames comprising the structured light pattern, perform computer vision operations on the video frames to detect a size of a face area of the video frames, determine a scale ratio in response to the size of the face area, extract the structured light pattern from the video frames, generate downscaled structured light image and generate a depth map in response to the downscaled structured light image and a downscaled reference image. A downscale operation may be performed in response to the scale ratio and the structured light pattern to generate the downscaled structured light image. The scale ratio may be calculated to enable the downscaled structured light image to be generated with a sufficient number of depth pixels.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
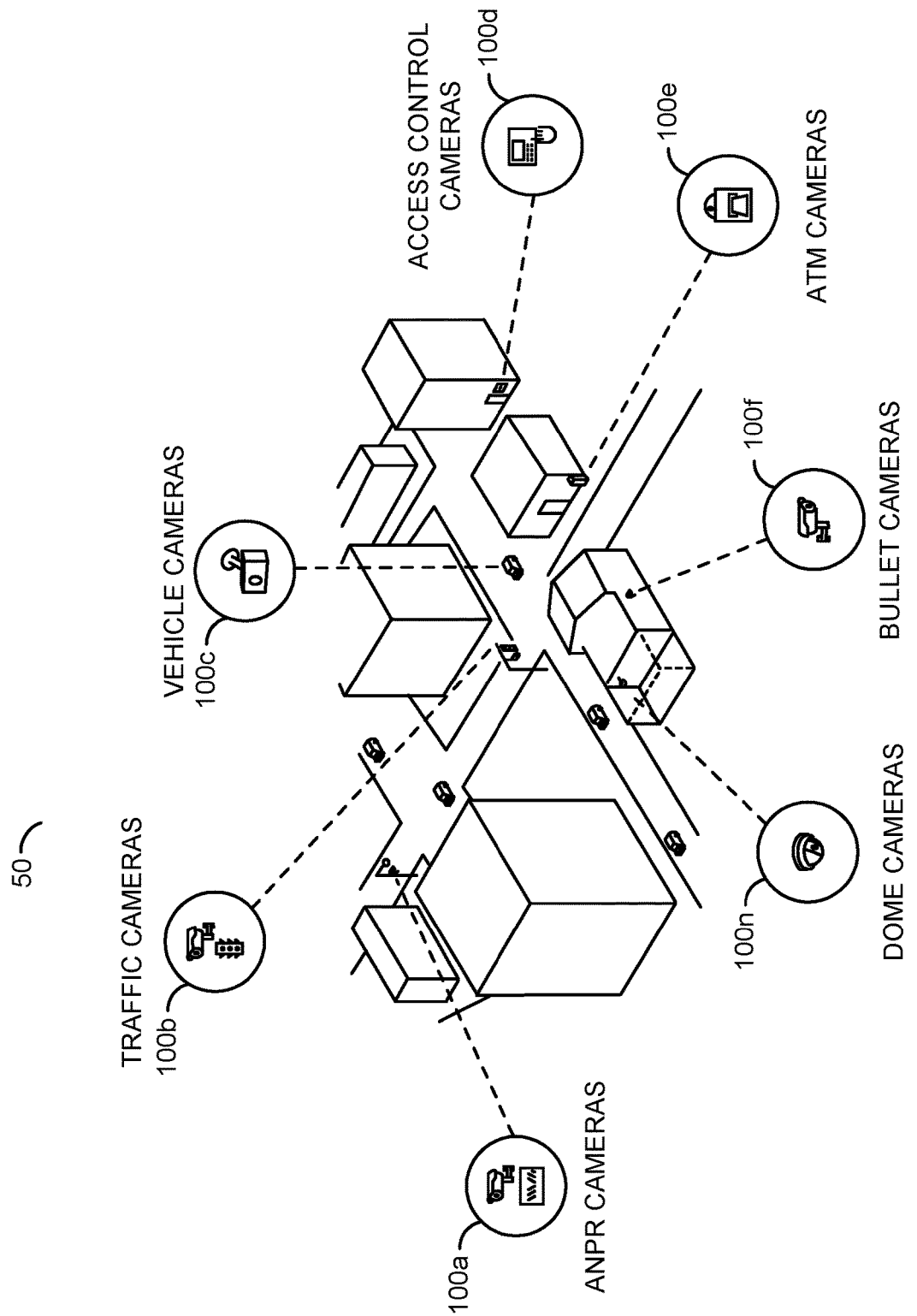
FIG. 1 is a diagram illustrating examples of edge devices that may utilize a processor configured to implement adaptive face depth image generation in accordance with example embodiments of the invention.

Embodiments of the present invention include providing adaptive face depth image generation that may (i) reduce a number of calculations for generating depth maps, (ii) enable liveness detection to be performed in real-time, (iii) provide consistent depth map calculation time, (iv) provide consistent depth maps for training liveness detection, (v) downscale a structured light pattern image while ensuring a sufficient number of depth pixels, (vi) provide sufficient depth pixels based on an expected range of a depth pixel number for liveness detection, (vii) dynamically create depth maps in various resolutions, (viii) calculate a scale ratio in response to a size of a face area and expected depth pixels, (ix) perform a downscaling operation that adds less calculation than the amount of calculations that are reduced for generating the depth images from downscaled images and/or (vi) be implemented as one or more integrated circuits.

Embodiments of the present invention may be configured to generate depth image adaptively. In an example, the adaptive depth images may be generated for the face liveness detection. The resolution of the depth images may depend on the resolution of live structured light pattern images. The live structured light pattern images and reference structured light images may be downscaled. By downscaling the live structured light pattern images and reference structured light images, depth maps of any resolution may be dynamically created. The adaptive depth maps of any resolution may be dynamically creating in response to varying sizes of faces captured.

Adaptively generating the depth images may shorten the depth computation time compared to generating depth images with full resolution structured light images (e.g., full live and reference light images). Adaptively generating the depth images may reduce the complexity of performing liveness detection techniques with the fixed depth face resolution (e.g., consistent face depth density). Generally, liveness detection techniques may operate with a range of a number of depth information that is considered sufficient in order to distinguish a real face from a fake face. The adaptive depth images generated by embodiments of the present invention may consistently create a face depth with a sufficient number of depth pixels for the liveness detection.

The sufficient number of depth pixels of the adaptive depth maps may be within the range of number of depth pixels for the liveness detection technique. The sufficient number of depth pixels may be provided to avoid unnecessary calculations that would be performed if providing depth images based on a large face area. Downscaling the structured light pattern images may provide the sufficient number of depth pixels, which may reduce the number of calculations performed for depth map calculation and the number of calculations performed for the liveness detection. Consistently creating the face depth maps with the sufficient number of depth pixels may prevent wasting time calculating excess depth information (e.g., unnecessary calculations may be avoided).

The amount of downscaling performed on the live structured light pattern images and/or the reference images may be selected to ensure block matching may be performed successfully. For example, the downscaling may be intelligently selected to allow a precision drop that does not result in a block match failure. Block match failure may occur in response to a large downscale factor that results in removing particular features of the structured light patterns. Embodiments of the present invention may control a scale factor for a downscaling operation. The scale factor may be controlled within an acceptable range (e.g., [1, 16]) to ensure that the block matching of the live structured light pattern may not be affected.

The precision drop may be proportional to the scale factor on the image width used for the downscaling operation. The granularity of the face disparity may be related to the width resolution. The closer an object (e.g., a face) is to the image sensor, the more disparity information may be available. A large face area resulting from a face being at a close distance to the image sensor may have a larger scale value and a larger disparity value. The larger disparity value may compensate for the loss of precision that may occur from the downscaling operation. The scale factor used to provide the downscale ratio may be adjusted by a user. Embodiments of the present invention may provide a tolerance parameter. The tolerance parameter may enable the user to tune a balance between calculation speed and depth map size.

Embodiments of the present invention may provide consistent performance and/or results of depth maps. Consistent depth maps may benefit training for a liveness detection technique. Consistent depth maps may provide accurate detection using the liveness detection technique. For example, the liveness detection technique may be focused on optimizing the detection of a particular face depth resolution instead of covering and training all cases of different (e.g., multiple) face depth resolutions.

Embodiments of the present invention may be configured to determine a face area in an image. Face detection may be implemented to determine an offset and size of a detected face. An expected number of depth pixels for a particular liveness detection technique may be fetched. The tolerance parameter may be adjusted by an end user (e.g., within the limits of expected number of depth pixels) to enable tuning between a choice of detection accuracy and calculation speed. The scale ratio may be calculated based on the size of the face area, the expected depth pixels and the tolerance parameter. Generally, the larger the face area is, the smaller the result of the scale ratio calculation. The downscaling operation may be performed based on the scale ratio. High resolution live structured light images and high resolution reference structured light images may be downscaled using the scale ratio. After performing the downscaling operations, the downscaled live structured light images and the downscaled reference structured light images may be used to generate the depth maps. The additional resources used to perform the downscaling operation may be less than the amount of resources saved by reducing the complexity of the depth map calculation in response to using the downscaled structured light images to generate the depth maps. Compared to using the full resolution structured light images, using the downscaled structured light images may reduce face depth calculation time and provide consistent face depth calculations. Consistent face depth map input may be beneficial for post processing operations.

Referring to FIG. 1, a diagram illustrating examples of edge devices that may utilize a processor configured to implement adaptive face depth image generation in accordance with example embodiments of the invention is shown. An overhead view of an area 50 is shown. In the example shown, the area 50 may be an outdoor location. Streets, vehicles and buildings are shown.

Devices 100a-100n are shown at various locations in the area 50. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100a-100n may be implemented at various indoor locations. In an example, edge devices 100a-100n may incorporate a convolutional neural network in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. The design, type and/or application performed by the edge devices 100a-100n may be varied according to the design criteria of a particular implementation.

Figure 2:
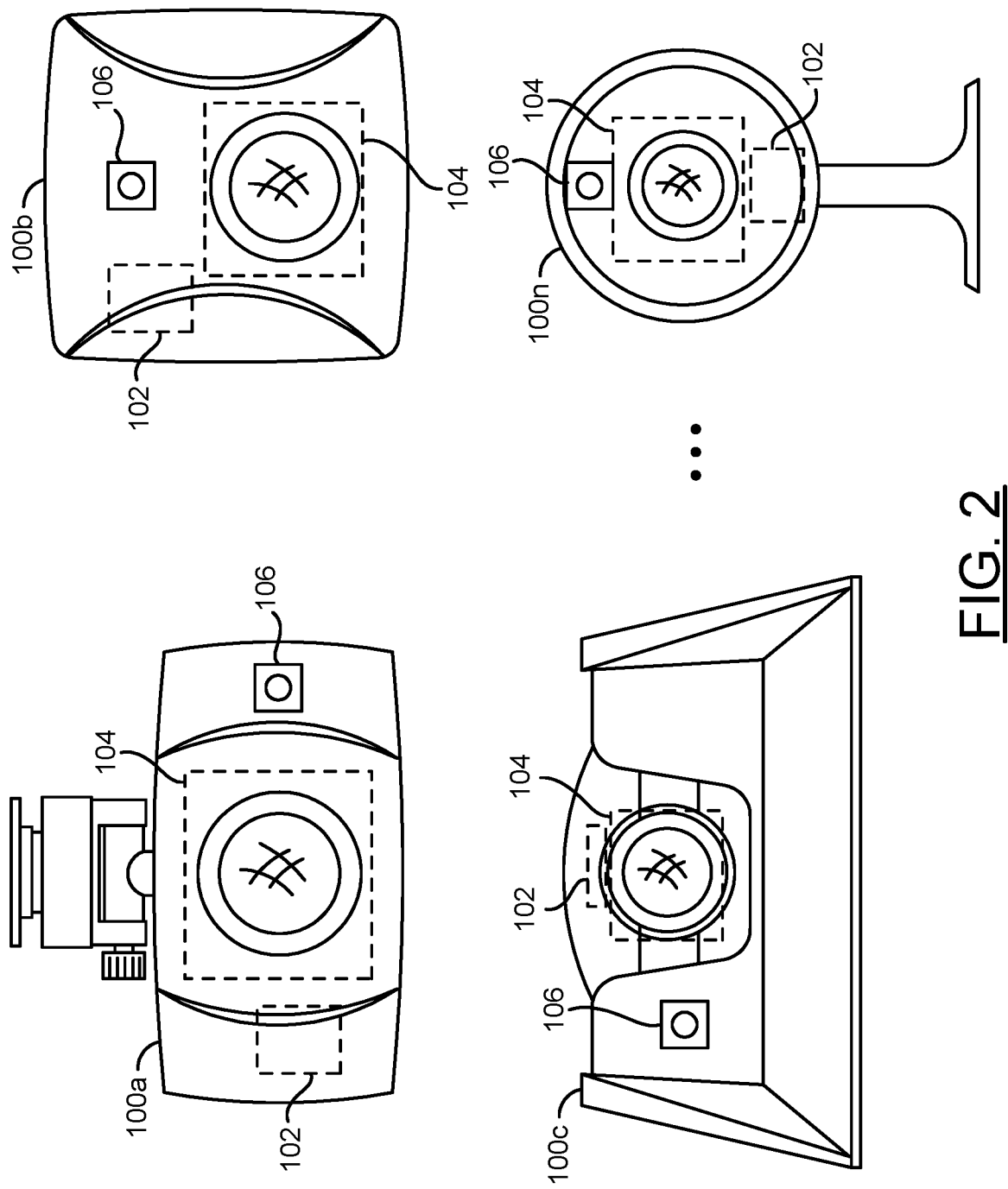
FIG. 2 is a diagram illustrating example cameras implementing an example embodiment of the present invention.

Referring to FIG. 2, a diagram illustrating example edge device cameras implementing an example embodiment of the present invention is shown. The camera systems 100a-100n are shown. Each camera device 100a-100n may have a different style and/or use case. For example, the camera 100a may be an action camera, the camera 100b may be a ceiling mounted security camera, the camera 100n may be a webcam, etc. Other types of cameras may be implemented (e.g., home security cameras, battery powered cameras, doorbell cameras, stereo cameras, etc.). The design/style of the cameras 100a-100n may be varied according to the design criteria of a particular implementation.

Each of the camera systems 100a-100n may comprise a block (or circuit) 102, a block (or circuit) 104 and/or a block (or circuit) 106. The circuit 102 may implement a processor. The circuit 104 may implement a capture device. The circuit 106 may implement a structured light projector. The camera systems 100a-100n may comprise other components (not shown). Details of the components of the cameras 100a-100n may be described in association with FIG. 3.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The structured light projector 106 may be configured to generate a structured light pattern (e.g., a speckle pattern). The structured light pattern may be projected onto a background (e.g., the environment). The capture device 104 may capture the pixel data comprising a background image (e.g., the environment) with the speckle pattern.

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, liveness detection, depth map generation, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100a-100n may operate independently from each other. For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

Figure 3:
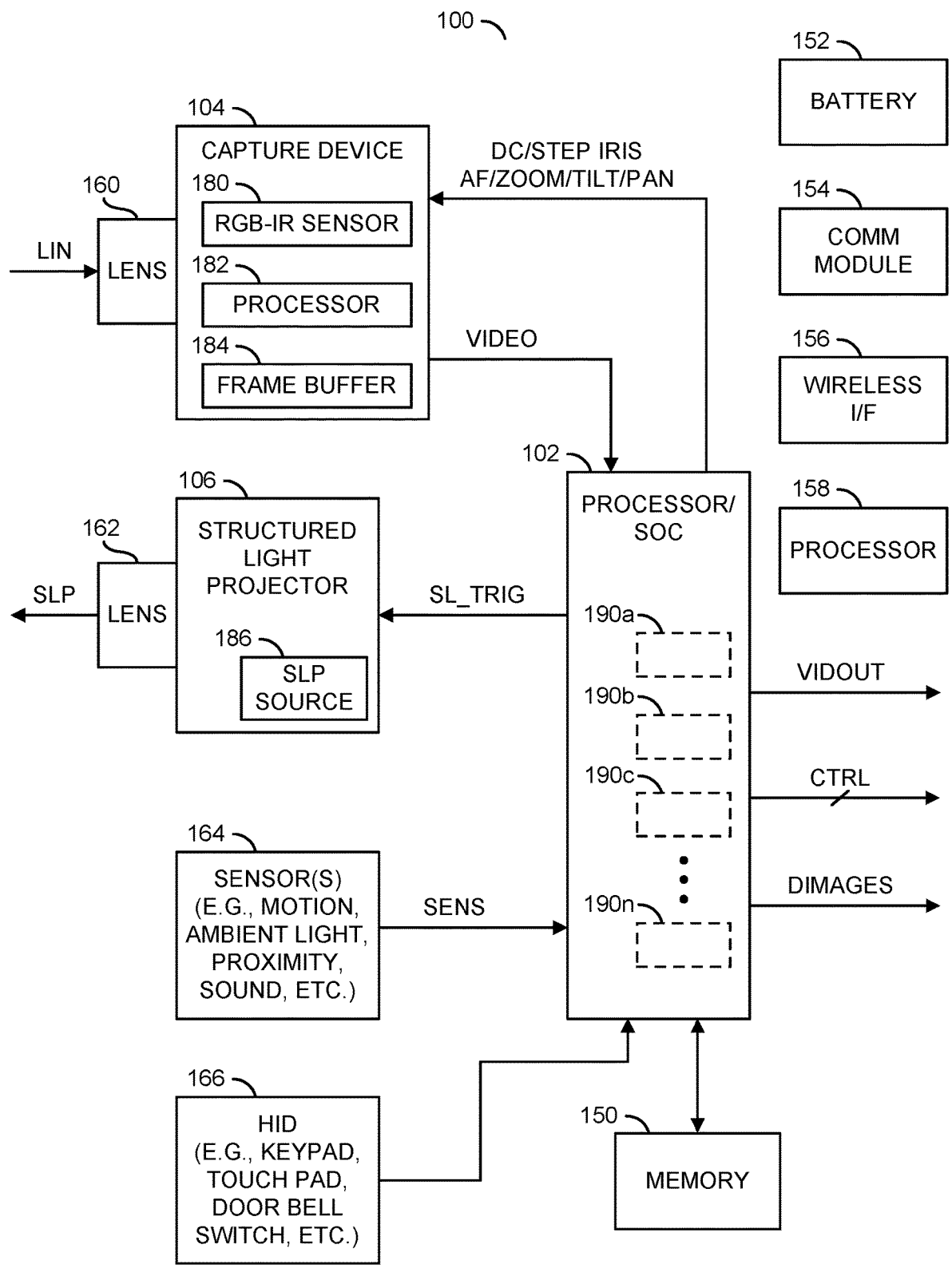
FIG. 3 is a diagram illustrating a block diagram of a camera system.

Referring to FIG. 3, a block diagram of the camera system 100 is shown illustrating an example implementation. The camera system 100 may be a representative example of the cameras 100a-100n shown in association with FIG. 2. The camera system 100 may comprise the processor/SoC 102, the capture device 104, and the structured light projector 106.

The camera system 100 may further comprise a block (or circuit) 150, a block (or circuit) 152, a block (or circuit) 154, a block (or circuit) 156, a block (or circuit) 158, a block (or circuit) 160, a block (or circuit) 162, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The block 162 may implement a structured light pattern lens. The circuit 164 may implement one or more sensors. The circuit 166 may implement a human interface device (HID). In some embodiments, the camera system 100 may comprise the processor/SoC 102, the capture device 104, the IR structured light projector 106, the memory 150, the lens 160, the IR structured light projector 106, the structured light pattern lens 162, the sensors 164, the battery 152, the communication module 154, the wireless interface 156 and the processor 158. In another example, the camera system 100 may comprise processor/SoC 102, the capture device 104, the structured light projector 106, the processor 158, the lens 160, the structured light pattern lens 162, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

The processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames.

The memory 150 may store data. The memory 150 may implement various types of memory including, but not limited to, a cache, flash memory, memory card, random access memory (RAM), dynamic RAM (DRAM) memory, etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets and/or metadata information. In some embodiments, the memory 150 may store reference images. The reference images may be used for computer vision operations, 3D reconstruction, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In an example, the memory 150 may store one or more directed acyclic graphs (DAGs) and one or more sets of weights and biases defining the one or more artificial neural network models. The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100a-100n, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., objects and/or the environment captured) and the speckle pattern generated by the structured light projector 106. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The structured light projector 106 may comprise a block (or circuit) 186. The circuit 186 may implement a structured light source. The structured light source 186 may be configured to generate a signal (e.g., SLP). The signal SLP may be a structured light pattern (e.g., a speckle pattern). The signal SLP may be projected onto an environment near the camera system 100. The structured light pattern SLP may be captured by the capture device 104 as part of the light input LIN.

The structured light pattern lens 162 may be a lens for the structured light projector 106. The structured light pattern lens 162 may be configured to enable the structured light SLP generated by the structured light source 186 of the structured light projector 106 to be emitted while protecting the structured light source 186. The structured light pattern lens 162 may be configured to decompose the laser light pattern generated by the structured light source 186 into a pattern array (e.g., a dense dot pattern array for a speckle pattern).

In an example, the structured light source 186 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source 186 may implement a near infrared (NIR) light source. In various embodiments, the light source of the structured light source 186 may be configured to emit light with a wavelength of approximately 940 nanometers (nm), which is not visible to the human eye. However, other wavelengths may be utilized. In an example, a wavelength in a range of approximately 800-1000 nm may be utilized.

The sensors 164 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication.

The processor/SoC 102 may receive the signal VIDEO and the signal SENS. The processor/SoC 102 may generate one or more video output signals (e.g., VIDOUT), one or more control signals (e.g., CTRL) and/or one or more depth data signals (e.g., DIMAGES) based on the signal VIDEO, the signal SENS, and/or other input. In some embodiments, the signals VIDOUT, DIMAGES and CTRL may be generated based on analysis of the signal VIDEO and/or objects detected in the signal VIDEO.

In various embodiments, the processor/SoC 102 may be configured to perform one or more of feature extraction, object detection, object tracking, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal DIMAGES comprising disparity maps and depth maps from the signal VIDEO. The video output signal VIDOUT and/or the depth data signal DIMAGES may be presented to the memory 150, the communications module 154, and/or the wireless interface 156. In some embodiments, the video signal VIDOUT and/or the depth data signal DIMAGES may be used internally by the processor 102 (e.g., not presented as output).

The signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operations of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern SLP.

The multi-step approach to activating and/or disabling the capture device 104 based on the output of the motion sensor

164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides nightvision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded, video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The oversampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, 3D reconstruction, liveness detection, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, U.S. patent application Ser. No. 16/288,922, filed on Feb. 28, 2019, U.S. patent application Ser. No. 15/593,493 (now U.S. Pat. No. 10,437,600), filed on May 12, 2017, U.S. patent application Ser. No. 15/931,942, filed on May 14, 2020, U.S. patent application Ser. No. 16/991,344, filed on Aug. 12, 2020, U.S. patent application Ser. No. 17/479,034, filed on Sep. 20, 2021, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, depth map generation, liveness detection, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190b may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190*b* may be pre-trained (e.g., configured to perform computer vision to detect objects based on the training data received to train the CNN module 190*b*). For example, the results of training data (e.g., a machine learning model) may be pre-programmed and/or loaded into the processor 102. The CNN module 190*b* may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190*b* may be varied according to the design criteria of a particular implementation.

The CNN module 190*b* may implement the feature extraction and/or object detection by performing convolution operations. The convolution operations may be hardware accelerated for fast (e.g., real-time) calculations that may be performed while consuming low power. In some embodiments, the convolution operations performed by the CNN module 190*b* may be utilized for performing the computer vision operations. In some embodiments, the convolution operations performed by the CNN module 190*b* may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190*b* may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190*b* may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190*b* to extract features from the training data may be varied according to the design criteria of a particular implementation.

Each of the hardware modules 190*a*-190*n* may implement a processing resource (or hardware resource or hardware engine). The hardware engines 190*a*-190*n* may be operational to perform specific processing tasks. In some configurations, the hardware engines 190*a*-190*n* may operate in parallel and independent of each other. In other configurations, the hardware engines 190*a*-190*n* may operate collectively among each other to perform allocated tasks. One or more of the hardware engines 190*a*-190*n* may be homogenous processing resources (all circuits 190*a*-190*n* may have the same capabilities) or heterogeneous processing resources (two or more circuits 190*a*-190*n* may have different capabilities).

Figure 4:
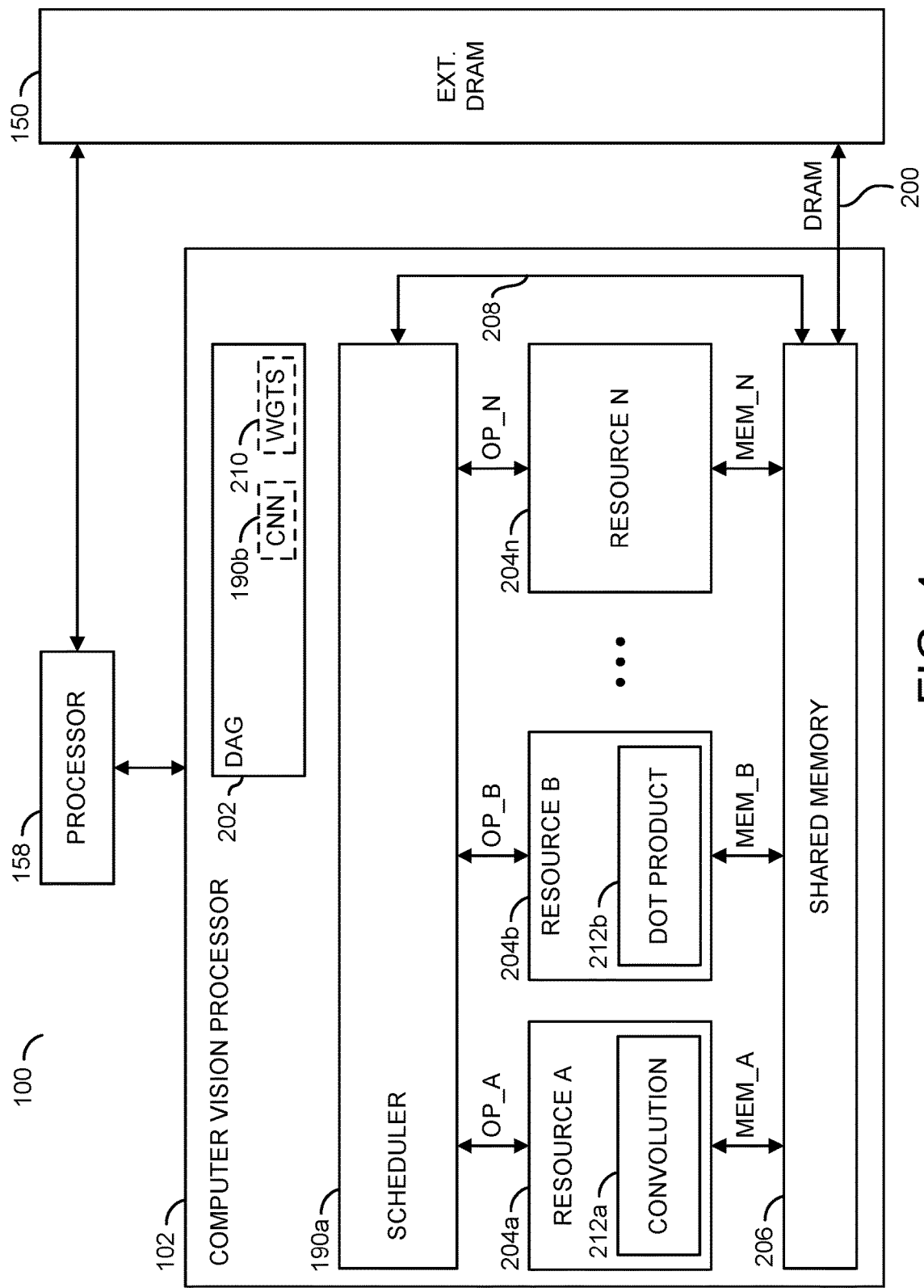
FIG. 4 is a diagram illustrating processing circuitry of a camera system implementing a convolutional neural network configured to perform 3D reconstruction.

Referring to FIG. 4, a diagram illustrating processing circuitry of a camera system implementing a convolutional neural network configured to perform 3D reconstruction is shown. In an example, processing circuitry of the camera system 100 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuitry of the camera system 100 generally comprises hardware circuitry that is optimized to provide a high performance image processing and computer vision pipeline in a minimal area and with minimal power consumption. In an example, various operations used to perform image processing, feature detection/extraction, 3D reconstruction, liveness detection, depth map generation and/or object detection/classification for computer (or machine) vision may be implemented using hardware modules designed to reduce computational complexity and use resources efficiently.

In an example embodiment, the processing circuit 100 may comprise the processor 102, the memory 150, the general purpose processor 158 and/or a memory bus 200. The general purpose processor 158 may implement a first processor. The processor 102 may implement a second processor. In an example, the circuit 102 may implement a computer vision processor. In an example, the processor 102 may be an intelligent vision processor. The memory 150 may implement an external memory (e.g., a memory external to the circuits 158 and 102). In an example, the circuit 150 may be implemented as a dynamic random access memory (DRAM) circuit. The processing circuitry of the camera system 100 may comprise other components (not shown). The number, type and/or arrangement of the components of the processing circuitry of the camera system 100 may be varied according to the design criteria of a particular implementation.

The general purpose processor 158 may be operational to interact with the circuit 102 and the circuit 150 to perform various processing tasks. In an example, the processor 158 may be configured as a controller for the circuit 102. The processor 158 may be configured to execute computer readable instructions. In one example, the computer readable instructions may be stored by the circuit 150. In some embodiments, the computer readable instructions may comprise controller operations. The processor 158 may be configured to communicate with the circuit 102 and/or access results generated by components of the circuit 102. In an example, the processor 158 may be configured to utilize the circuit 102 to perform operations associated with one or more neural network models.

In an example, the processor 102 generally comprises the scheduler circuit 190a, a block (or circuit) 202, one or more blocks (or circuits) 204a-204n, a block (or circuit) 206 and a path 208. The block 202 may implement a directed acyclic graph (DAG) memory. The DAG memory 202 may comprise the CNN module 190b and/or weight/bias values 210. The blocks 204a-204n may implement hardware resources (or engines). The block 206 may implement a shared memory circuit. In an example embodiment, one or more of the circuits 204a-204n may comprise blocks (or circuits) 212a-212n. In the example shown, the circuit 212a and the circuit 212b are implemented as representative examples in the respective hardware engines 204a-204b. One or more of the circuit 202, the circuits 204a-204n and/or the circuit 206 may be an example implementation of the hardware modules 190a-190n shown in association with FIG. 3.

In an example, the processor 158 may be configured to program the circuit 102 with one or more pre-trained artificial neural network models (ANNs) including the convolutional neural network (CNN) 190b having multiple output frames in accordance with embodiments of the invention and weights/kernels (WGTS) 210 utilized by the CNN module 190b. In various embodiments, the CNN module 190b may be configured (trained) for operation in an edge device. In an example, the processing circuitry of the camera system 100 may be coupled to a sensor (e.g., video camera, etc.) configured to generate a data input. The processing circuitry of the camera system 100 may be configured to generate one or more outputs in response to the data input from the sensor based on one or more inferences made by executing the pre-trained CNN module 190b with the weights/kernels (WGTS) 210. The operations performed by the processor 158 may be varied according to the design criteria of a particular implementation.

In various embodiments, the circuit 150 may implement a dynamic random access memory (DRAM) circuit. The circuit 150 is generally operational to store multidimensional arrays of input data elements and various forms of output data elements. The circuit 150 may exchange the input data elements and the output data elements with the processor 158 and the processor 102.

The processor 102 may implement a computer vision processor circuit. In an example, the processor 102 may be configured to implement various functionality used for computer vision. The processor 102 is generally operational to perform specific processing tasks as arranged by the processor 158. In various embodiments, all or portions of the processor 102 may be implemented solely in hardware. The processor 102 may directly execute a data flow directed to execution of the CNN module 190b, and generated by software (e.g., a directed acyclic graph, etc.) that specifies processing (e.g., computer vision, 3D reconstruction, liveness detection, etc.) tasks. In some embodiments, the processor 102 may be a representative example of numerous computer vision processors implemented by the processing circuitry of the camera system 100 and configured to operate together.

In an example, the circuit 212a may implement convolution operations. In another example, the circuit 212b may be configured to provide dot product operations. The convolution and dot product operations may be used to perform computer (or machine) vision tasks (e.g., as part of an object detection process, etc.). In yet another example, one or more of the circuits 204c-204n may comprise blocks (or circuits) 212c-212n (not shown) to provide convolution calculations in multiple dimensions. In still another example, one or more of the circuits 204a-204n may be configured to perform 3D reconstruction tasks.

In an example, the circuit 102 may be configured to receive directed acyclic graphs (DAGs) from the processor 158. The DAGs received from the processor 158 may be stored in the DAG memory 202. The circuit 102 may be configured to execute a DAG for the CNN module 190b using the circuits 190a, 204a-204n, and 206.

Multiple signals (e.g., OP_A-OP_N) may be exchanged between the circuit 190a and the respective circuits 204a-204n. Each of the signals OP_A-OP_N may convey execution operation information and/or yield operation information. Multiple signals (e.g., MEM_A-MEM_N) may be exchanged between the respective circuits 204a-204n and the circuit 206. The signals MEM_A-MEM_N may carry data. A signal (e.g., DRAM) may be exchanged between the circuit 150 and the circuit 206. The signal DRAM may transfer data between the circuits 150 and 190a (e.g., on the transfer path 208).

The scheduler circuit 190a is generally operational to schedule tasks among the circuits 204a-204n to perform a variety of computer vision related tasks as defined by the processor 158. Individual tasks may be allocated by the scheduler circuit 190a to the circuits 204a-204n. The scheduler circuit 190a may allocate the individual tasks in response to parsing the directed acyclic graphs (DAGs) provided by the processor 158. The scheduler circuit 190a may time multiplex the tasks to the circuits 204a-204n based on the availability of the circuits 204a-204n to perform the work.

Each circuit 204a-204n may implement a processing resource (or hardware engine). The hardware engines 204a-204n are generally operational to perform specific processing tasks. The hardware engines 204a-204n may be implemented to include dedicated hardware circuits that are optimized for high-performance and low power consumption while performing the specific processing tasks. In some configurations, the hardware engines 204a-204n may operate in parallel and independent of each other. In other configurations, the hardware engines 204a-204n may operate collectively among each other to perform allocated tasks.

The hardware engines 204a-204n may be homogenous processing resources (e.g., all circuits 204a-204n may have the same capabilities) or heterogeneous processing resources (e.g., two or more circuits 204a-204n may have different capabilities). The hardware engines 204a-204n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In an example, the hardware engines 204a-204n may comprise matrices stored in various memory buffers. The matrices stored in the memory buffers may enable initializing the convolution operator. The convolution operator may be configured to efficiently perform calculations that are repeatedly performed for convolution functions. In an example, the hardware engines 204a-204n implementing the convolution operator may comprise multiple mathematical circuits configured to handle multi-bit input values and operate in parallel. The convolution operator may provide an efficient and versatile solution for computer vision and/or 3D reconstruction by calculating convolutions (also called cross-correlations) using a one-dimensional or higher-dimensional kernel. The convolutions may be useful in computer vision operations such as object detection, object recognition, edge enhancement, image smoothing, etc. Techniques and/or architectures implemented by the invention may be operational to calculate a convolution of an input array with a kernel. Details of the convolution operator may be described in association with U.S. Pat. No. 10,310,768, filed on Jan. 11, 2017, appropriate portions of which are hereby incorporated by reference.

In various embodiments, the hardware engines 204a-204n may be implemented solely as hardware circuits. In some embodiments, the hardware engines 204a-204n may be implemented as generic engines that may be configured through circuit customization and/or software/firmware to operate as special purpose machines (or engines). In some embodiments, the hardware engines 204a-204n may instead be implemented as one or more instances or threads of program code executed on the processor 158 and/or one or more processors 102, including, but not limited to, a vector processor, a central processing unit (CPU), a digital signal processor (DSP), or a graphics processing unit (GPU). In some embodiments, one or more of the hardware engines 204a-204n may be selected for a particular process and/or thread by the scheduler 190a. The scheduler 190a may be configured to assign the hardware engines 204a-204n to particular tasks in response to parsing the directed acyclic graphs stored in the DAG memory 202.

The circuit 206 may implement a shared memory circuit. The shared memory 206 may be configured to store data in response to input requests and/or present data in response to output requests (e.g., requests from the processor 158, the DRAM 150, the scheduler circuit 190a and/or the hardware engines 204a-204n). In an example, the shared memory circuit 206 may implement an on-chip memory for the computer vision processor 102. The shared memory 206 is generally operational to store all of or portions of the multidimensional arrays (or vectors) of input data elements and output data elements generated and/or utilized by the hardware engines 204a-204n. The input data elements may be transferred to the shared memory 206 from the DRAM circuit 150 via the memory bus 200. The output data elements may be sent from the shared memory 206 to the DRAM circuit 150 via the memory bus 200.

The path 208 may implement a transfer path internal to the processor 102. The transfer path 208 is generally operational to move data from the scheduler circuit 190a to the shared memory 206. The transfer path 208 may also be operational to move data from the shared memory 206 to the scheduler circuit 190a.

The processor 158 is shown communicating with the computer vision processor 102. The processor 158 may be configured as a controller for the computer vision processor 102. In some embodiments, the processor 158 may be configured to transfer instructions to the scheduler 190a. For example, the processor 158 may provide one or more directed acyclic graphs to the scheduler 190a via the DAG memory 202. The scheduler 190a may initialize and/or configure the hardware engines 204a-204n in response to parsing the directed acyclic graphs. In some embodiments, the processor 158 may receive status information from the scheduler 190a. For example, the scheduler 190a may provide a status information and/or readiness of outputs from the hardware engines 204a-204n to the processor 158 to enable the processor 158 to determine one or more next instructions to execute and/or decisions to make. In some embodiments, the processor 158 may be configured to communicate with the shared memory 206 (e.g., directly or through the scheduler 190a, which receives data from the shared memory 206 via the path 208). The processor 158 may be configured to retrieve information from the shared memory 206 to make decisions. The instructions performed by the processor 158 in response to information from the computer vision processor 102 may be varied according to the design criteria of a particular implementation.

Figure 5:
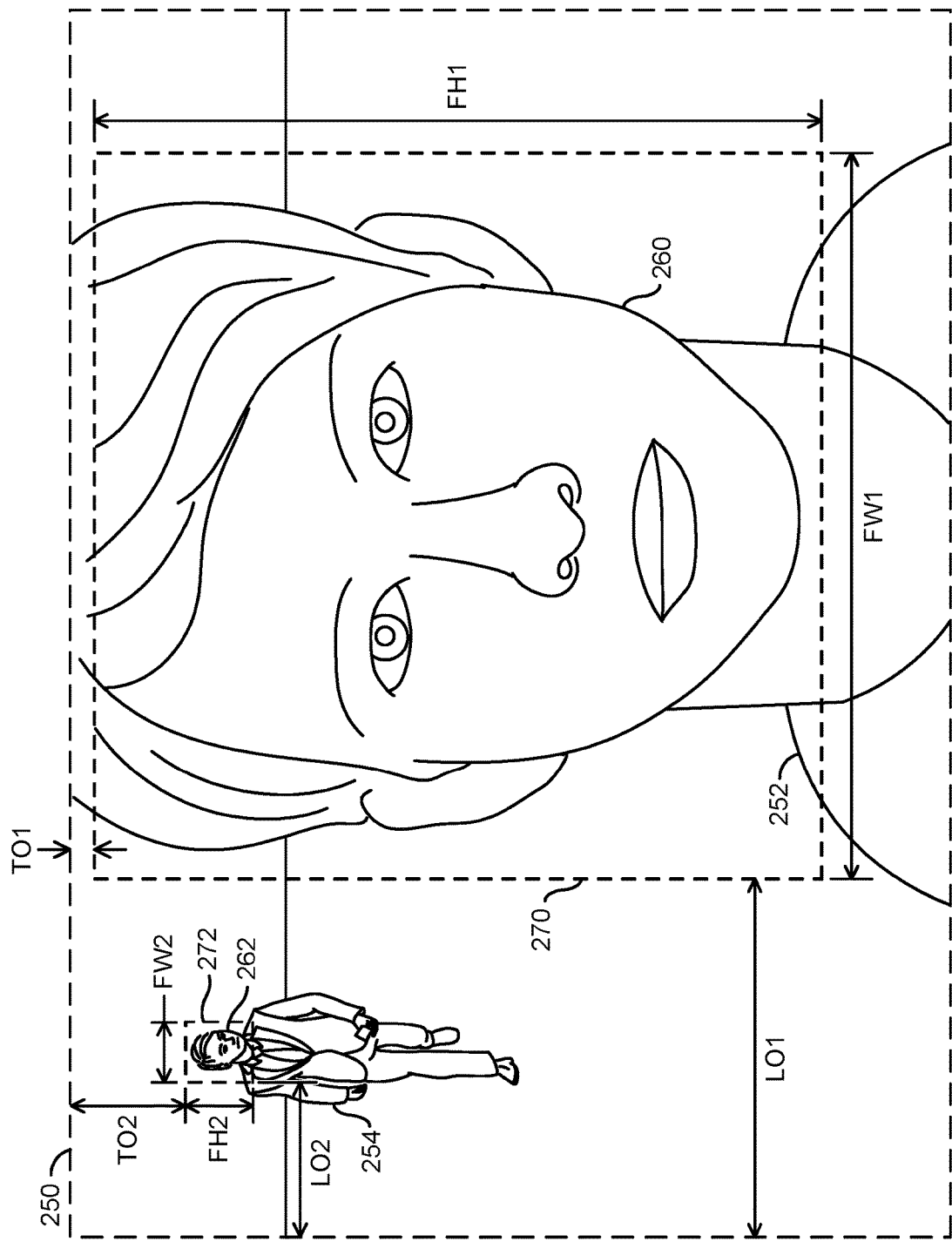
FIG. 5 is a diagram illustrating an example video frame comprising a large face area and a small face area.

Referring to FIG. 5, a diagram illustrating an example video frame comprising a large face area and a small face area is shown. An example video frame 250 is shown. The example video frame 250 may be an illustrative example of one video frame of a sequence of video frames analyzed by the processor 102. The example video frame 250 may comprise pixel data arranged as a video frame provided to the CNN module 190b. The CNN module 190b may be configured to analyze the pixel data of the video frame 250 to detect a size and/or location of a face region of people captured in the video frame 250. In an example, the video frame 250 may comprise a RGB image captured while the structured light projector 106 is not projecting the structured light pattern SLP.

The example video frame 250 may be a video captured of an entrance of a secured area (e.g., a view from a security device implementing the capture device 104 to permit access through a locked door). The example video frame 250 may be a video captured by a smartphone to unlock access to the smartphone. The example video frame 250 may be a video captured by a smart doorbell and/or a home security camera. The example video frame 250 may be a video captured by a camera configured to focus on detected faces. The use-case for capturing and analyzing the example video frame 250 may be varied according to the design criteria of a particular implementation.

The example video frame 250 may comprise a person 252 and a person 254. A face 260 of the person 252 is shown occupying a large portion of the example video frame 250. For example, the face 260 may be up close to the image sensor 180 in a foreground of the example video frame 250 (e.g., in front of the capture device 104). A face 262 of the person 254 is shown occupying a small portion of the example video frame 250. For example, the face 262 may be farther away from the image sensor 180 than the face 260. The face 262 may be in the background of the example video frame 250. In one example, the person 252 may be a subject of authorization by the apparatus 100 and the person 254 may be a pedestrian walking that happened to be captured in the video frame 250 (e.g., a bystander that may not even be unaware of the capture device 104).

Dotted shapes 270-272 are shown. The dotted shapes 270-272 may represent the detection of an object by the computer vision operations performed by the processor 102. The dotted shapes 270-272 may each comprise the pixel data corresponding to an object detected by the computer vision operations pipeline and/or the CNN module 190b. In the example shown, the dotted shapes 270-272 may be detected in response to face detection operations performed by the computer vision operations pipeline and/or the CNN module 190b. The dotted shapes 270-272 are shown for illustrative purposes. In an example, the dotted shapes 270-272 may be visual representations of the object detection (e.g., the dotted shapes 270-272 may not appear on an output video frame). In another example, the dotted shapes 270-272 may be a bounding box generated by the processor 102 displayed on the output video frames to indicate that an object has been detected (e.g., the bounding boxes 270-272 may be displayed in a debug mode of operation).

The computer vision operations may be configured to detect characteristics of the detected objects, behavior of the objects detected and/or a liveness of the objects detected. The characteristics of the objects may comprise a height, length, width, slope, an arc length, a color, an amount of light emitted, detected text on the object, a path of movement, a speed of movement, a direction of movement, a proximity to other objects, etc. The characteristics of the detected object may comprise a status of the object (e.g., opened, closed, on, off, etc.). The behavior and/or liveness may be determined in response to the type of object and/or the characteristics of the objects detected. While one example video frame 250 is shown, the behavior and/or liveness of an object may be determined by analyzing a sequence of video frames captured over time. For example, a path of movement and/or speed of movement characteristic may be used to determine that an object classified as a person may be walking or running. The types of characteristics and/or behaviors detected may be varied according to the design criteria of a particular implementation.

In the example shown, the bounding box 270 may be the face/head of the foreground person 252 and the bounding box 272 may be the face/head of the background person 254. In an example, the settings (e.g., the feature set) for the processor 102 may define objects of interest to be people and/or faces. For example, trees, plants, decorations, furniture, vehicles may not be objects of interest for a feature set defined to detect people and/or faces. In the example shown, the bounding box 270 and the bounding box 272 are shown having a square (or rectangular) shape. In some embodiments, the shape of the bounding boxes 270-272 that correspond to the faces detected may be formed to follow the shape of the faces (e.g., an irregular shape that follows the curves of the faces 260-262 of the people 252-254).

The processor 102 and/or the CNN module 190b may be configured to implement face detection techniques. The face detection techniques may be performed on an RGB image. The processor 102 may loop the face detection technique (e.g., iteratively perform face detection throughout the example video frame 250) in order to determine if any faces are within the field of view of the lens 160 and/or the image sensor 180. In the example shown, by iteratively performing the face detection technique, the processor 102 may detect the face 260 within the bounding box 270 and the face 262 within the bounding box 272.

The processor 102 may determine whether any faces are present in the video frames analyzed. If a face has been captured in a video frame, the processor 102 may record a size of the face and an offset (e.g., a location) of the faces. In the example shown, the processor 102 may detect the face 260 and the face 262. The processor 102 may store the location of the faces in the memory 150.

In the example video frame 250, a size FH1 and a size FW1 of the bounding box 270 are shown. The size FH1 may represent a height measurement of the face 260 detected by the processor 102. The size FW1 may represent a width measurement of the face 260 detected by the processor 102. Similarly, a size FH2 and a size FW2 of the bounding box 272 are shown. The size FH2 may represent a height measurement of the face 262 detected by the processor 102. The size FW2 may represent a width measurement of the face 262 detected by the processor 102. The height and width of each of the faces detected may be stored by the memory 150. In an example, the memory 150 may store the size FH1 and the size FW1 for the face 260 and the size FH2 and the size FW2 for the face 262.

The processor 102 may further determine an offset for the face 260 and the face 262. The offset may be used to determine a location in the video frame 250 of each of the faces detected. The offset may be calculated based on a distance from the edge of the video frame 250. The offset for the bounding boxes 270-272 may be stored in the memory 150.

In the example video frame 250, a horizontal offset LO1 and a vertical offset TO1 of the bounding box 270 are shown. The horizontal offset LO1 may represent an offset measurement of the face 260 measured by the processor 102 from a vertical edge of the example video frame 250. The vertical offset TO1 may represent an offset measurement of the face 260 measured by the processor 102 from a horizontal edge of the example video frame 250. Similarly, a horizontal offset LO2 and a vertical offset TO2 of the bounding box 272 are shown. The horizontal offset LO2 may represent an offset measurement of the face 262 measured by the processor 102 from the vertical edge of the example video frame 250 (e.g., the same vertical edge used for the offset measurement LO1). The vertical offset TO2 may represent a vertical offset of the face 262 measured by the processor 102 from the horizontal edge of the example video frames 250 (e.g., the same horizontal edge used for the offset measurement TO1). The horizontal offset and the vertical offset of each of the faces detected may be stored by the memory 150. In an example, the memory 150 may store the horizontal offset LO1 and the vertical offset TO1 for the face 260 and the horizontal offset LO2 and the vertical offset TO2 for the face 262.

In the example shown, the horizontal offsets LO1-LO2 are shown measured with respect to a left edge of the example video frames 250. In some embodiments, both the horizontal offset measurements may be performed from a right edge of the example video frame 250. In some embodiments, the horizontal offset measurements may be measured from different vertical edges (e.g., a closest vertical edge to the bounding boxes). In the example shown, the vertical offsets TO1-TO2 are shown measured with respect to a top edge of the example video frames 250. In some embodiments, both the vertical offset measurements may be performed from a bottom edge of the example video frame 250. In some embodiments, the vertical offset measurements may be measured from different horizontal edges (e.g., a closest horizontal edge to the bounding boxes). In the example shown, two offset measurements are calculated. In some embodiments, an offset measurement may be performed for each corner of the bounding boxes 270-272. In some embodiments, an offset measurement may be performed for each edge of a bounding box that detects an irregular shape (e.g., for each side of a polygonal shape). The type of offset measurements performed may be varied according to the design criteria of a particular implementation.

The processor 102 may perform various face detection techniques in order to detect the size and/or location of the faces 260-262. In one example, the processor 102 may measure the height and width of the faces 260-262 by measuring a number of pixels for the height and width of the bounding boxes 270-272. In another example, the processor 102 may compare a relative number of pixels of the bounding boxes 270-272 with an object of known size and/or an object in a reference image. For example, the processor 102 may determine a pixel per metric calculation for the bounding box 270 and the bounding box 272. In the example shown, the bounding boxes 270-272 are generally shown aligned with the edges of the example video frame 250 (e.g., the faces 260-262 are facing the image sensor 180 directly with no rotation). In embodiments where the faces 260-262 are rotated with respect to the example video frame 250, the processor 102 may be configured to rotate the bounding boxes to determine the heights FH1-FH2 and the widths FW1-FW2 for the detected faces. In some embodiments, where the lens 160 introduces distortion (e.g., a barrel distortion) the processor 102 may perform dewarping before detecting the faces 260-262. The method of determining a size and/or location of the detected faces in the video frames may be varied according to the design criteria of a particular implementation.

In the example shown, the bounding box 270 may be much larger than the bounding box 272. The bounding box 270 may occupy a greater portion of the area of the video frame 250 than the bounding box 272. In an example, if the video frame 250 is a 1920×1080 resolution video frame, the bounding box 270 may comprise the height FH1 of 800 pixels and the width FW1 of 700 pixels (e.g., a 700×800 pixel region of interest) and the bounding box 272 may comprise the height FH2 of 100 pixels and the width FW2 of 100 pixels (e.g., a 100×100 pixel region of interest). Since the bounding box 270 comprises more pixel data than the bounding box 272, the processor 102 may need to perform more calculations to generate depth maps and/or perform liveness detection for the face 260 than for the face 262. However, since the face 260 is closer to the image sensor 180 and the pixel data for the face 260 may comprise more details than the face 262, the processor 102 may downscale the video frame 250 and still retain sufficient pixel data to generate the depth maps and/or perform the liveness detection. For example, the smaller face 262 may comprise sufficient pixel data to detect liveness. The amount of pixel data for the larger face 260 may provide additional accuracy but also result in unnecessary calculations. The processor 102 may be configured to determine whether analyzing the larger face 260 comprises unnecessary calculations and perform the downscaling to prevent performing unnecessary calculations. For example, downscaling the face 260 to the size of the smaller face 262 may still result in sufficient pixel data to detect liveness while reducing the amount of calculations to detect the liveness of the face 260.

Figure 6:
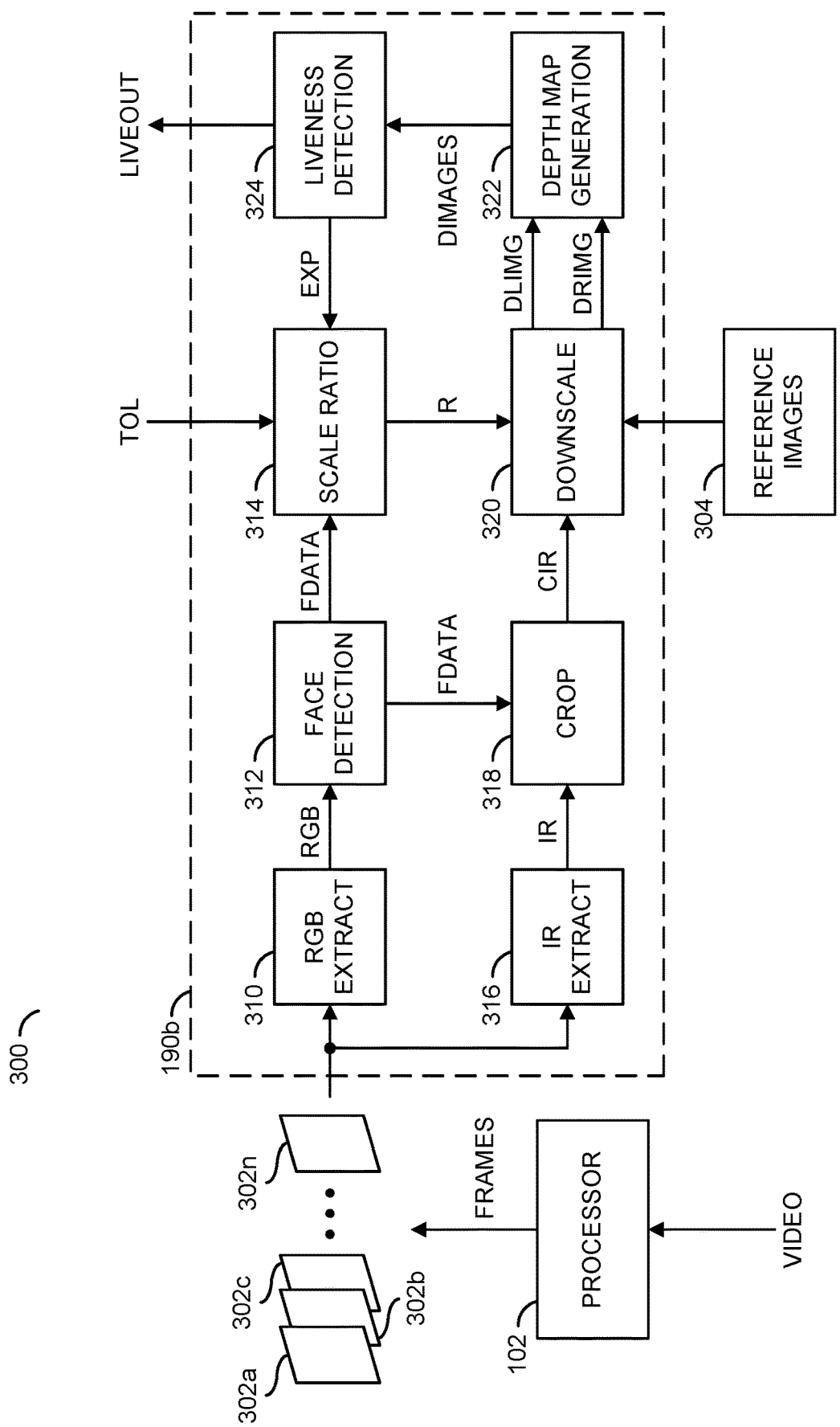
FIG. 6 is a block diagram illustrating operations of a processor for adaptive face depth image generation.

Referring to FIG. 6, a block diagram illustrating operations of a processor for adaptive face depth image generation is shown. Adaptive face depth image generation components 300 are shown. The adaptive face depth image generation components 300 may comprise various hardware, conceptual blocks, inputs and/or outputs that may be used by the apparatus 100 to perform the adaptive face depth generation. The adaptive face depth image generation components 300 may be represented as a block diagram that illustrates the operations performed by the apparatus 100 to reduce a number of calculations performed for generating depth maps from video frames comprising the structured light pattern SLP (e.g., the signal DIMAGES) and/or performing post-processing on the depth maps generated.

The adaptive face depth image generation components 300 may comprise the processor 102, the CNN module 190b, video frames 302a-302n and/or reference images 304. The processor 102 and the CNN module 190b are shown as separate components for illustrative purposes. However, the CNN module 190b may be a component implemented by the processor 102. The reference images 304 may be stored by the memory 150.

The processor 102 may be configured to receive the signal VIDEO. The signal VIDEO may comprise the RGB-IR pixel data generated by the image sensor 180. The pixel data may comprise information captured of the environment and/or objects near the capture device 104 along with the structured light pattern SLP projected onto the environment and/or objects. The processor 102 may generate a signal (e.g., FRAMES). The signal FRAMES may comprise the video frames 302a-302n. The processor 102 may be configured to process the pixel data arranged as the video frames 302a-302n comprising the structured light pattern SLP. The video frames 302a-302n may be presented to (e.g., processed internally by the processor 102 using) the CNN module 190b. The processor 102 may be capable of performing other operations using the video frames 302a-302n (e.g., generated encoded video frames for display, packetize the video frames 302a-302n for communication using the communication module 154, etc.).

The CNN module 190b may be configured to receive the video frames 302a-302n, the reference images 304 and/or a signal (e.g., TOL). The CNN module 190b may be configured to generate a signal (e.g., LIVEOUT). The signal TOL may comprise a parameter configured to tune and/or select options for the adaptive face depth generation. The signal LIVEOUT may comprise an output result. The CNN module 190b may be configured to receive and/or generate other input/output. The number, type and/or format of the input/ output communicated to/from the CNN module 190b may be varied according to the design criteria of a particular implementation.

The reference images 304 may be presented to the CNN module 190b from the memory 150. The reference images 304 may comprise video data and/or pixel data of an environment with the structured light pattern. The reference images 304 may comprise known objects and/or features that may provide a basis for comparison with the live captured video frames 302a-302n. In an example, the reference images 304 may comprise labels for various objects, features, characteristics, distances, sizes, etc. The reference images 304 may be used to perform block matching with the input video frames 302a-302n (e.g., newly captured video data). The reference images 304 may be captured and prepared offline. The reference images 304 may be acquired and preprocessed before the pixel data for the input video images 302a-302n are generated by the capture device 104 and arranged as video frames by the processor 102. In some embodiments, the reference images 304 may be labeled manually by people. The reference images 304 may be used for computer vision operations, 3D reconstruction, depth map generation, etc. The reference images 304 may enable 3D reconstruction to be performed when the monocular lens 160 is implemented. The memory 150 may be configured to store multiple reference images 304 of various reference locations and/or objects (e.g., faces) at different distances to have a basis for comparison of the structured light pattern SLP captured in the live video frames 302a-302n. The reference images 304 may comprise images in an IR YUV format. The reference images 304 may comprise dot patterns associated with various distances to a lens and/or various types of objects. The number of the reference images 304 stored and/or the various features, characteristics and/or distances for the structured light pattern SLP may be varied according to the design criteria of a particular implementation.

The CNN module 190b may comprise a block (or circuit) 310, a block (or circuit) 312, a block (or circuit) 314, a block (or circuit) 316, a block (or circuit) 318, a block (or circuit) 320, a block (or circuit) 322 and/or a block (or circuit) 324. The circuit 310 may implement an RGB extraction module. The circuit 312 may implement a face detection module. The circuit 314 may comprise a scale ratio module. The circuit 316 may implement an IR extraction module. The circuit 318 may implement a crop module. The circuit 320 may implement a downscale module. The circuit 322 may implement a depth map generation module. The circuit 324 may implement a post-processing module. The circuits 310-324 may be implemented as discrete hardware modules and/or combinations of the hardware engines 204a-204n combined to perform a particular task. The circuits 310-324 may be conceptual blocks illustrative of various techniques implemented by the CNN module 190b. The CNN module 190b may comprise other components (not shown). The number, type and/or arrangement of the components of the CNN module 190b.

The video frames 302a-302n may be presented to the RGB extraction module 310 and the IR extraction module 316. The RGB extraction module 310 and the IR extraction module 316 may be configured to extract appropriate content from the video frames 302a-302n for the subsequent modules in the CNN module 190b.

The RGB extraction module 310 may receive the video frames 302a-302n. The RGB extraction module 310 may be configured to extract the RGB data (or the RGB video frames) from the RGB-IR video frames 302a-302n. The RGB extraction module 310 may be configured to generate a signal (e.g., RGB). The signal RGB may comprise the RGB channel data extracted from the video frames 302a-302n. The signal RGB may comprise the RGB information without the structured light pattern SLP. The signal RGB may be presented to the face detection module 312.

The face detection module 312 may be configured to receive the signal RGB. The signal RGB may comprise the RGB channel information from the video frames 302a-302n. The face detection module 312 may perform various face detection techniques to detect the faces 260-262. The face detection techniques may be performed on the RGB information from the video frames 302a-302n. The face detection module 312 may be configured to generate a signal (e.g., FDATA). The signal FDATA may comprise information about the faces detected in the video frames 302a-302n. In an example, the signal FDATA may comprise the face heights FH1-FH2, the face widths FW1-FW2 and/or offset information LO1-LO2 and TO1-TO2 about the faces 260-262. The signal FDATA may be presented to the scale ratio module 314 and/or the crop module 318. Details of the face detection performed by the face detection module 312 may be described in association with FIG. 5.

The scale ratio module 314 may be configured to receive the signal FDATA, the signal TOL and/or a signal (e.g., EXP). The scale ratio module 314 may be configured to determine a scale ratio for the downscaling operations. The scale ratio module 314 may be configured to generate a signal (e.g., R). The signal R may comprise the scale ratio calculated in response to the signal FDATA, the signal TOL and/or the signal EXP. The scale ratio signal R may be presented to the downscale module 320.

The signal EXP may comprise a post-processing parameter. In the example shown, the post-processing parameter may comprise an expected depth pixels value for liveness detection performed by the post-processing module 324. In some embodiments, for other types of post-processing operations, the post-processing parameter may comprise other data about sufficient pixel data.

The scale ratio module 314 may be configured to fetch the expected number of depth pixels. Liveness detection techniques may have a range of required number of face depth pixels. If a face depth resolution is beyond the minimum threshold for the number of face depth pixels, the liveness detection accuracy may increase slightly. Generally, with an increase of face depth resolution, the calculation time for liveness detection performed by the post-processing module 324 may have a linearly proportional increase, but the liveness detection accuracy may barely improve. The tolerance parameter TOL may be set by a user to adjust the expected depth pixels depending on a choice between detection accuracy and calculation speed.

The scale ratio module 314 may be configured to calculate the scale ratio R of the structured light pattern image given the size of the face area (e.g., the signal FDATA) and the expected depth pixels (e.g., the signal EXP). The scale ratio module 314 may calculate the scale ratio R based on a formula [1]:

$$R = (E/W \times H) + T \qquad [1]$$

In the formula [1], E may represent the expected depth pixels (e.g., from the signal EXP), W may represent the face width (e.g., FW1 from the signal FDATA), H may represent the face height (e.g., FH1 from the signal FDATA), R may represent the scale ratio and the signal T may represent the tolerance parameter (e.g., the signal TOL).

Various sizes of face areas may result in different scale ratios. The larger the size of the face area, the smaller the result calculated for the scale ratio. In one example, if the liveness detection technique needs 10000 depth pixels to detect fraud (e.g., distinguish a fake face from a real face), the tolerance is set to 0.1, and the face area is 100×200 pixels, then the downscale ratio may be 0.6.

The IR extraction module 316 may receive the video frames 302a-302n. The IR extraction module 316 may be configured to extract the IR data (or the IR video frames) from the RGB-IR video frames 302a-302n. The IR extraction module 316 may be configured to generate a signal (e.g., IR). The signal IR may comprise the IR channel data extracted from the video frames 302a-302n. The signal IR may comprise the structured light pattern SLP. The signal IR may comprise full resolution IR images. The signal IR may be presented to the downscale module 320.

The crop module 318 may be configured to perform cropping operations on the full resolution structured light images from the signal IR. The crop module 318 may remove and/or delete a number of pixels from the full resolution structured light images. Removing and/or deleting pixels may reduce a size and/or change an aspect ratio of the full resolution structured light images.

The crop module 318 may perform cropping operations to remove and/or delete pixels in response to the signal FDATA. The signal FDATA may comprise the offset values (e.g., LO1, TO1, LO2, TO2, etc.) and the dimensions (e.g., FW1, FH1, FW2, FH2, etc.) that may be used to locate the faces within the full resolution structured light images. For example, in response to the offset values and/or dimension values in the signal FDATA, the crop module 318 may determine a location of the bounding boxes 270-272 of the faces 260-262 in the video frame. The cropping operation may be performed for each of the full resolution structured light images in the signal IR that have a face detected.

The cropping operations may be performed to delete pixel values that do not correspond to the location of the face. For example, after the copping operation is performed by the crop module 318, most of the remaining pixel values may correspond to the location of the face in the original video frames 302a-302n. In one example, the cropped video frames may be a rectangular shape. Each of the cropped video frames may have a rectangular shape of different sizes (e.g., different aspect ratios) depending on the location and orientation of the faces detected.

The crop module 318 may generate a signal (e.g., CIR). The signal CIR may comprise cropped full resolution structured light images. For example, the IR images in the signal CIR may have a smaller size (e.g., fewer pixel values) than the IR images in the signal IR. The signal CIR may be presented to the downscale module 320.

The downscale module 320 may be configured to downscale the cropped structured light images from the signal CIR. The downscale module 320 may downscale the cropped structured light images from the IR data extracted and then cropped from the live video frames 302a-302n and/or the structured light reference images 304. After the scale ratio module 314 calculates the scale ratio R, the downscale module 320 may perform the downscale operations on the cropped full resolution live IR images extracted from the video frames 302a-302n and the reference images 304 to generate structured light images downscaled to a desired size. The desired size may retain sufficient pixel data to enable successful post-processing while eliminating unnecessary calculations for generating depth images.

The downscale module 320 may generate a signal (e.g., DLIMG) and a signal (e.g., DRIMG). The signal DLIMG may comprise the downscaled live structured light images. The downscaled live structured live images DLIMG may be generated in response to the live structured light IR images extracted from the video frames 302a-302n and the scale ratio R. The signal DRIMG may comprise the downscaled reference structured light images. The downscaled reference structured light images DRIMG may be generated in response to the reference structured light video frames 304 and the scale ratio R. In one example, the downscaled reference structured light images DRIMG may be generated in response to the downscale operation performed on a single reference image. In another example, the downscaled structured light reference images DRIMG may be generated in response multiple of the reference images 304. In some embodiments, the scale ratio R may be determined in real time for a single reference image 304. For example, the downscaled live structured light images DLIMG and the downscaled reference structured light image DRIMG may be generated in real time after the scale ratio R is calculated. In some embodiments, the scale ratio may be pre-calculated using multiple of the reference images 304. The downscaled live structured light images DLIMG and the downscaled reference structured light images DRIMG may be presented to the depth map module 322.

Generating the downscaled live structured light images DLIMG and the downscaled reference structured light images DRIMG may enable the depth map module 322 to generate depth maps more efficiently than generating the depth maps from the high resolution live images 302a-302n and the reference images 304. For example, the generation of the depth maps may be sped up because less calculation time may be needed as a result of fewer calculations to perform on the downscaled live structured light images DLIMG and the downscaled reference structured light images DRIMG compared to the amount of calculations that would be performed on full resolution structured light images IR (or cropped full resolution structured light images) and the full resolution reference images 304.

The downscale operations performed by the downscale module 320 may use additional resources compared to when no downscale operations are performed (e.g., there may be an increase of calculations in order to perform the downscale operations to generate the downscaled live structured light images DLIMG and the downscaled reference structured light images DRIMG). The complexity of calculations for performing the downscaling operations may result in fewer calculations and/or time to perform the calculations compared to the additional calculations used to generate the depth maps using the full resolution IR images extracted from the full resolution live video frames 302a-302n and the reference images 304. In one example, a time cost of performing the downscale operations by the video processing hardware of the downscale module 320 may be approximately one millisecond for a 1920×1080 image input. For example, the additional time cost of the downscaling operations may be negligible compared to the time savings from generating the depth maps from the downscaled live structured light images DLIMG and the downscaled reference structured light images DRIMG instead of the full resolution IR images extracted from the live video frames 302a-302n and the reference images 304. The reduced number of calculations that may result because of the smaller size of the downscaled live structured light images DLIMG and the downscaled reference structured light images DRIMG may be linearly proportional to the change in size from the full resolution IR images.

The depth map module 322 may be configured to generate depth maps. The depth map module 322 may be configured to receive the downscaled live structured light images DLIMG and the downscaled reference structured light images DRIMG from the downscale module 320. The depth map module 322 may be configured to generate the signal DIMAGES. The signal DIMAGES may be generated in response to the downscaled live structured light images DLIMG and the downscaled reference structured light images DRIMG. In an example, the depth map module 322 may be configured to compare the downscaled live structured light images DLIMG across the downscaled reference live structured images DRIMG to look for matching patterns. The depth maps DIMAGES may be presented to the post-processing module 324. Details of the depth map generation may be described in association with U.S. patent application Ser. No. 17/479,034, filed on Sep. 20, 2021, appropriate portions of which are incorporated by reference.

When the depth map module 322 generates the depth maps DIMAGES based on the downscaled live structured light images DLIMG and the downscaled reference structured light images DRIMG, the depth map images DIMAGES may be generated faster compared to generating the depth maps using the video frames 302a-302n and the reference images 304. Since the downscaled live structured light images DLIMG and the downscaled reference structured light images DRIMG may comprise consistent resolution values, the depth maps DIMAGES may be generated having a consistent resolution. The depth maps DIMAGES generated in response to the downscaling operations may comprise consistent depth images.

Performing the downscaling operations using the scale ratio R may ensure that a sufficient number of depth pixels are retained for the downscaled live structured light images DLIMG and the downscaled reference structured light images DRIMG. Retaining the sufficient number of depth pixels may enable the depth maps DIMAGES to be generated while avoiding performing calculations on excess depth information. Retaining the sufficient number of depth pixels may prevent a block match failure when using the downscaled live structured light images DLIMG and the downscaled reference structured light images DRIMG. Retaining the sufficient number of depth pixels may ensure that the depth maps DIMAGES comprise the expected range of depth pixels for the liveness detection performed by the post-processing module 324.

Implementing the crop module 318 before the downscale module 320 may enable the cropping of the live IR image before the downscale operation. Performing the cropping before downscaling may reduce the operation time of downscale operation performed by the downscale module 320 (e.g., the downscale operation is performed on the cropped image, which has fewer pixel values). The cropping operations may be performed on the live IR images in the signal CIR. The cropping operations may not be performed on the reference images 304. For example, the signal DLIMG may comprise downscaled and cropped live images and the signal DRIMG may comprise downscaled reference images. The signal DLIMG may comprise a field of view of the face, while the signal DRIMG may comprise a full field of view. The depth map module 322 may analyze the cropped and downscaled structured light pattern in the signal DLIMG and search for matching patterns across the downscaled reference structured light images in the signal DRIMG.

The scale ratio R may be calculated to enable the depth maps DIMAGES to be dynamically created at a range of resolutions that correspond to the size of the face area of the detected faces in the RGB channel of the live video frames 302a-302n. The size of the face area may be a variable size in each of the video frames 302a-302n based partially on a distance of the people 252-254 from the image sensor 180. The tolerance value TOL may be a configurable value that may be set by a user (or preconfigured for the apparatus 100) to enable a user to adjust the downscale operation between detection accuracy and a calculation speed. The range of values for the tolerance value TOL may be selected to ensure that the scale ratio R results in the sufficient number of depth pixels.

The post-processing module 324 may be configured to perform one or more post-processing techniques. In the example shown, the post-processing technique may comprise liveness detection. Generally, the liveness detection techniques implemented by the post-processing module 324 may use a CNN. However, the apparatus 100 may be configured to receive the signal EXP in order to generate the scale ratio R even when the liveness detection techniques are not implemented using CNN (e.g., the post-processing module 324 is implemented without using the CNN module 190b). The type of post-processing performed may be varied according to the design criteria of a particular implementation.

The post-processing module 324 may be configured to determine whether a detected face is a real face or a fake face (e.g., detect fraud) in response to the depth maps generated by the depth map module 322. The post-processing module 324 may be configured to receive the signal DIMAGES. The post-processing module 324 may be configured to generate the signal EXP and the signal LIVEOUT. The signal EXP may be the expected number of depth pixels for the post-processing module 324 to perform the liveness detection technique.

The signal LIVEOUT may be generated in response to the depth maps DIMAGES. For example, the signal LIVEOUT may comprise a determination (e.g., a Boolean value, a percentage of likelihood, a confidence value, etc.) of whether the face (s) detected in the video frames 302a-302n are real (e.g., live) or fake. The signal LIVEOUT may be used by the processor 102 for various functionality. In an example, the processor 102 may generate the signal CTRL in response to the signal LIVEOUT (e.g., to authenticate that an authorized person has been detected in order to enable access to a secured area). The use of the results of the signal LIVEOUT (e.g., the results of the liveness detection performed by the post-processing module 324) may be varied according to the design criteria of a particular implementation.

Compared to the generating the depth maps using the full resolution video frame 302a-302n and the reference images 304 without downscaling, implementing the downscaling operations to generate the depth maps DIMAGES in response to the downscaled live structured light images DLIMG and the downscaled reference structured light images DRIMG may reduce a face depth calculation time. Furthermore, the face depth calculation by the depth map module 322 may be consistently performed. Providing the consistent depth maps DIMAGES to the post-processing module 324 may provide an advantage for the post-processing (e.g., liveness detection). In one example, providing the post-processing module 324 with consistent face depth input may enable the liveness detection technique to be trained for a particular amounts of pixels instead of training against all resolutions. In another example, providing the post-processing module 324 with consistent face depth input may enable the liveness detection technique to detect face liveness at one particular amount of pixels. The consistent face depth input may reduce a complexity for the post-processing operations.

The signal DIMAGES may comprise the depth maps with a consistent number of total pixels of the downscaled face area (e.g., a consistent face depth density. For example, the downscaled and cropped structured light images may have varying aspect ratios, but may result in depth maps with the consistent face depth density. In one example, after cropping and downscaling one of the live structured light images may have a face area of 100×100 pixels and another one of the live structured light images may have a consistent depth density with a face area of 125×80 pixels (e.g., different aspect ratios, but each have 10000 pixels). When the scale ratio R is calculated in real time (e.g., using a single reference image), the total number of pixels may be generally the same for each of the depth images after downscale. When the scale ratio R is pre-calculated (e.g., using multiple reference images), the final downscale ratio may be smaller than the real time calculated scale ratio in order to keep the density always higher than the target density.

Figure 7:
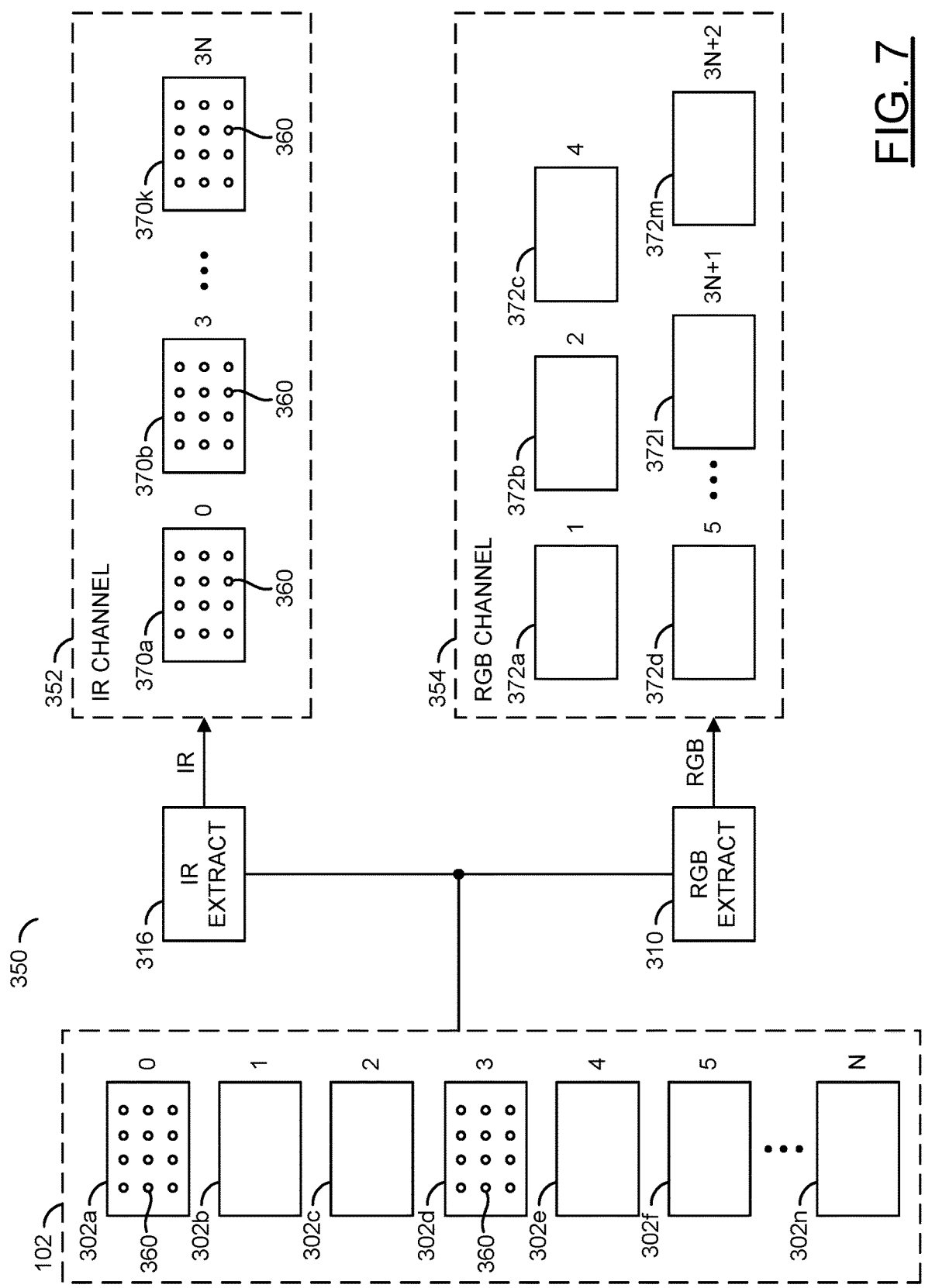
FIG. 7 is a diagram illustrating extracting IR video frames for downscaling.

Referring to FIG. 7, a diagram illustrating extracting IR video frames for downscaling is shown. An example RGB/IR dispatch 350 is shown. The example RGB/IR dispatch 350 may illustrate extracting RGB video frames and IR video frames from the video frames 302a-302n generated by the processor 102.

The example RGB/IR dispatch 350 may comprise the processor 102, the RGB extraction module 310, the IR extraction module 316, a block (or circuit) 352 and/or a block (or circuit) 354. The block 352 may represent an IR image channel. The block 354 may represent an RGB image channel. While the video frames 302a-302n are shown within the processor 102, each of the RGB extraction module 310, the IR extraction module 316, the IR image channel 352 and/or the RGB image channel 354 may be implemented within the processor 102 and/or the CNN module 190b.

In the example shown, the video frames 302a-302n may be generated with the structured light projector 106 generating the structured light pattern SLP in one third of the input frames. Dots 360 are shown in the video frame 302a and the video frame 302d (e.g., every third video frame) as an illustrative example of the structured light pattern SLP. While the dots 360 are shown with a same pattern for illustrative purposes, the dot pattern may be different for each of the video frames 302a-302n that capture the structured light pattern SLP. With the structured light pattern SLP timed to be projected in one third of the input frames, the dot pattern 360 may be captured in every third of the video frames 302a-302n. While a one third structured light pattern projection timing is shown, the apparatus 100 may be implemented with other rules to dispatch and/or extract the IR images and the RGB images from the video frames 302a-302n.

The video frames 302a-302n may be presented to the RGB extraction module 310 and the IR extraction module 316. The RGB extraction module 310 may generate the signal RGB. The signal RGB may communicate the RGB channel 354 (e.g., the RGB subset of the video frames 302a-302n). The IR extraction module 316 may generate the signal IR. The signal IR may communicate the IR channel 352 (e.g., the IR subset of the video frames 302a-302n).

The IR channel 352 may comprise IR images 370a-370k. The IR images 370a-370k may each comprise the dot pattern 360. The IR images 370a-370k may each comprise a full resolution IR image. The IR image 370a may correspond to (e.g., have the same dot pattern 360 as) the video frame 302a and the IR image 370b may correspond to the video frame 302d. Since the structured light pattern SLP is projected and captured for a subset of the video frames 302a-302n, the IR channel 352 may comprise fewer of the IR images 370a-370k than the total number of the video frames 302a-302n generated. In the example shown, the IR channel 352 may comprise every third one of the video frames 302a-302n.

The structured light pattern SLP may be exposed on the IR channel data. The IR data may be extracted by the IR extraction module 316 from the output of the RGB-IR sensor 180. The IR images 370a-370k may be formatted into an IR YUV image. The IR images 370a-370k comprising the dot patterns 360 in the IR YUV image format may be presented to the crop module 318. The crop module 318 may crop the IR images 370a-370k in the IR YUV format that include the structured light dot patterns 360. The cropped structured light images may be presented to the downscale module 320. The downscale module 320 may downscale the cropped IR images (e.g., the signal CIR) in the IR YUV format that include the structured light dot patterns 360.

The RGB channel 354 may comprise RGB images 372a-372m. The RGB images 372a-372m may not comprise the dot pattern 360. For example, the structured light projector 106 may be timed to be turned off during the capture of the RGB images 372a-372m. The RGB image 372a may correspond to (e.g., have the same RGB pixel data as) the video frame 302b, the RGB image 372b may correspond to the video frame 302c, the RGB image 372c may correspond to the video frame 302e, the RGB image 372d may correspond to the video frame 302f, etc. Since the structured light pattern SLP is projected and captured for a subset of the video frames 302a-302n (e.g., the IR images 370a-370k) and is off for another subset of the video frames 302a-302n (e.g., the RGB images 372a-372m), the RGB channel 354 may comprise fewer of the RGB images 372a-372m than the total number of the video frames 302a-302n generated, but more than the total number of the IR images 370a-370k.

The RGB data may be extracted by the RGB extraction module 310 from the output of the RGB-IR sensor 180. The RGB images 372a-372m may be formatted into an RGB image format. The RGB images 372a-372m may be communicated to the face detection module 312. The downscaling factor (e.g., the scale ratio R) may depend on the CNN-based face detection result (e.g., the bounding box resolution of the detected face, the offset location of the face, etc.) determined from the RGB images 372a-327m. The detection of the faces performed by the face detection module 312 may be performed on the RGB data (e.g., without the dot patterns 360). For generating the adaptive face depth images, the RGB images 372a-372m may not need to be cropped or downscaled (e.g., the signal RGB may not be presented to the crop module 318 and/or the downscale module 320. However, cropping and/or downscaling may be performed on the RGB images 372a-372m for other video processing operations performed by the processor 102.

Figure 8:
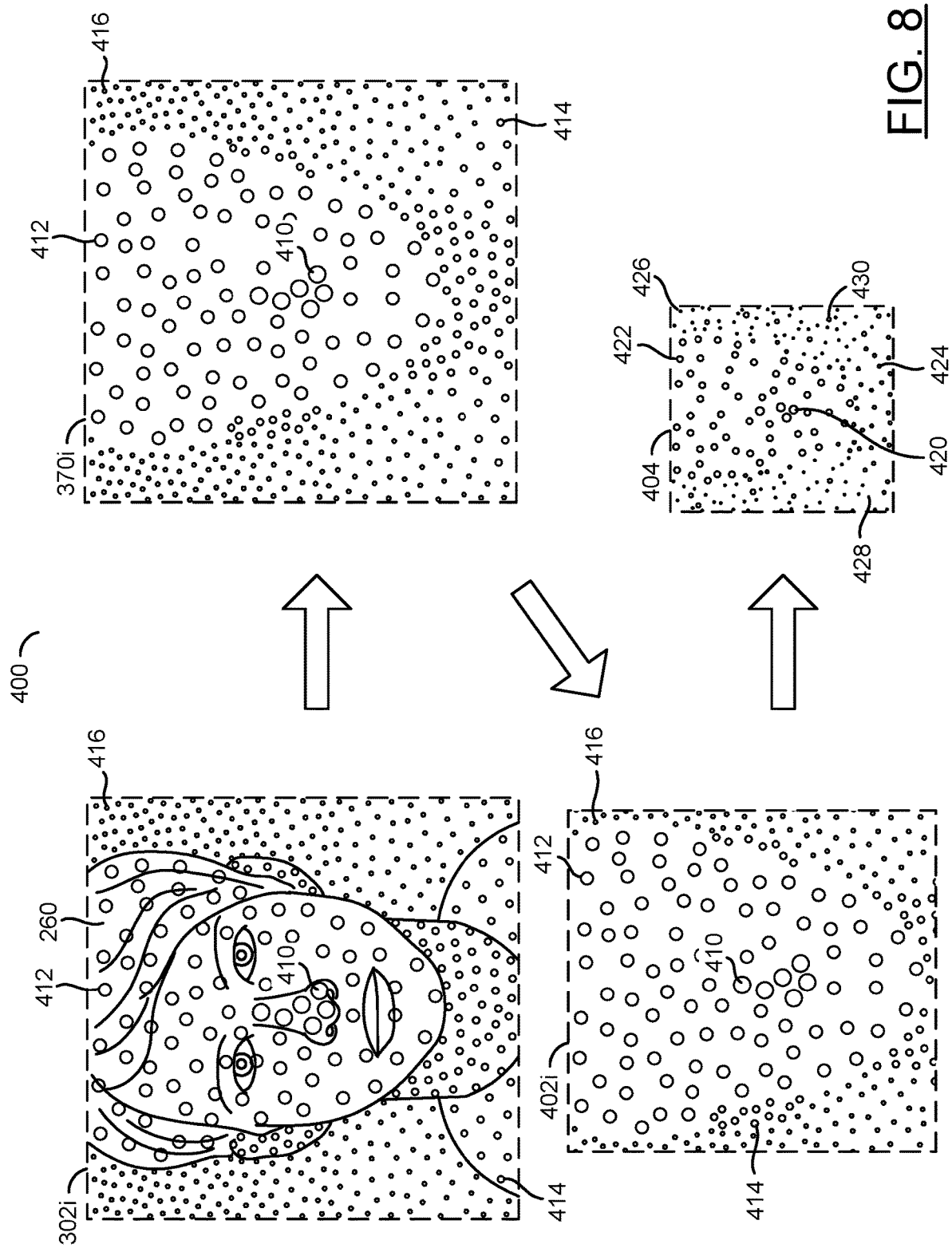
FIG. 8 is a diagram illustrating downscaling a structured light pattern.

Referring to FIG. 8, a diagram illustrating downscaling a structured light pattern is shown. A downscaling example 400 is shown. The downscaling example may comprise one of the video frames 302i (e.g., comprising the RGB and IR data), the full resolution IR image 370*i* (e.g., comprising the structured light pattern SLP), a cropped IR image 402*i* and a downscaled IR image 404.

The video frame 302*i* may be a representative example of one of the video frames 302*a*-302*n*. The face 260 is shown. The video frame 302*i* may illustrate how the dot pattern 360 is projected onto the face 260 and other portions of the video frame 302*i*. The structured light pattern SLP may comprise largest dots 410, large dots 412, small dots 414 and/or smallest dots 416. Details of generating the structured light pattern SLP and/or analyzing dot patterns and/or object distances based on the structured light pattern SLP may be described in U.S. application Ser. No. 17/479,034, filed on Sep. 20, 2021, appropriate portions of which are incorporated by reference.

The largest dots 410 may be located in the video frame 302*i* at locations closest to the lens 160. The largest dots 410 may be clustered on the nose of the face 260. The large dots 412 may be located in the video frame 302*i* at locations close to the lens 160 but not as close as the largest dots 410. The large dots 410 may be located on the face 260. The small dots 414 may be located in the video frame 302*i* at locations farther from the lens 160 than the dots 412. The small dots 414 may be located on the ears, neck and shoulders of the person in the video frame 302*i*. The smallest dots 416 may located in the video frame 302*i* at locations farthest from the lens 160. The smallest dots 416 may be located around the face 260 (e.g., on the background behind the person in the video frame 302*i*). While four sizes of dots 410-416 are shown for illustrative purposes, the number of sizes of dots and/or the size of each of the dots of the structured light pattern may be varied according to the locations of various objects and/or features of objects in the video frames 302*a*-302*n*.

The full resolution IR image 370*i* may be generated in response to the video frame 302*i* being operated on by the IR extraction module 316. The full resolution IR image 370*i* may be the same size (e.g., resolution, dimensions, aspect ratio, etc.) as the video frame 302*i*. The full resolution IR image 370*i* may have the same scale as the video frame 302*i*. The full resolution IR image 370*i* may illustrate the dots 410-416 without the RGB data that shows the face 260. The dots 410-416 in the full resolution IR image 370*i* are shown having a same pattern and sizes as the dots 410-416 in the video frame 302*i*.

The cropped IR image 402*i* may be a representative example of cropped IR images 402*a*-402*k* in the signal CIR. The cropped IR image 402*i* may be generated in response to the full resolution IR image 370*i* being operated on by the crop module 318. The cropped IR image 402*i* may be smaller than the full resolution IR image 370*i* (e.g., fewer number of pixels, lower resolution, smaller dimensions, different aspect ratio, etc.). The cropped IR image 402*i* may have the same scale as the full resolution IR image 370*i*. The cropped IR image 402*i* may illustrate the dots 410-416 without the RGB data and with some of the pixel data from the full resolution IR image 370*i* removed and/or deleted. The dots 410-416 in the cropped IR image 402*i* that have not been deleted and/or removed are shown having a same pattern and sizes as the dots 410-416 in the full resolution IR image 370*i*.

The crop module 318 may use the face location and/or size information in the signal FDATA to remove and/or delete pixel data from the full resolution IR image 370*i* that does not correspond to the face 260. In the example shown, some of the dots 414 that correspond to the neck of the face 260 and some of the dots 416 that correspond to the background around the face 260 have been deleted. For example, the size of the face represented by the dots 410-414 in the cropped IR image 402*i* may be the same size as the face represented by the dots 410-414 in the full resolution IR image 370*i* (e.g., the dots 410-416 may have the same scale). The cropped IR image 402*i* may be smaller (e.g., in terms of total number of pixels) as a result of deleting many of the pixels that do not correspond to the location of the face 260. For example, the cropped IR image 402*i* may have fewer total pixels than the full resolution IR image 370*i*, but the number of pixels representing the face 260 may be the same in both the cropped IR image 402*i* and the full resolution IR image 370*i*.

The downscaled IR image 404 may be generated by the downscale module 320 in response to the cropped IR image 402*i* and the scale ratio R. In some embodiments, when cropping is not performed, the downscaled IR image 404 may be generated by the downscale module 320 in response to the full resolution IR image 370*i* and the scale ratio R. A target resolution (or a target pixel density) of the downscaled IR images may be pre-defined by the post-processing techniques performed after the generation of the depth maps DIMAGES. The scale ratio R used by the downscale module 320 may vary in order to adapt to changes of the face resolution in the corresponding RGB images 372*a*-372*m* (e.g., the face moving closer or farther away from the lens 160).

The generation of the downscaled IR image 404 may downscale the IR data. Downscaling the IR data may result in some of the dot pattern of the captured structured light pattern SLP being lost and/or changed. The determination of the scale ratio R may prevent the loss of data from the structured light pattern SLP from affecting the generation of the depth maps DIMAGES and/or the result of the post-processing. For example, the scale ratio R may enable a sufficient amount of IR data to be retained to ensure the depth maps DIMAGES are generated to enable the post-processing techniques (e.g., liveness detection). In one example, the downscaling performed by the downscale module 320 may comprise a bilinear technique. In another example, the downscaling performed by the downscale module 320 may comprise a bicubic technique. Other downscaling techniques may be implemented (e.g., Lanczos, nearest neighbor, etc.). The type of downscaling technique(s) performed may be varied according to the design criteria of a particular implementation.

The downscaled IR image 404 may comprise largest downscaled dots 420, large downscaled dots 422, small downscaled dots 424 and/or smallest downscaled dots 426. The largest downscaled dots 420 may generally correspond to a location and/or pattern of the largest dots 410 of the cropped IR image 402*i*. The large downscaled dots 422 may generally correspond to a location and/or pattern of the large dots 412 of the cropped IR image 402*i*. The small downscaled dots 424 may generally correspond to a location and/or pattern of the small dots 414 of the cropped IR image 402*i*. The smallest downscaled dots 426 may generally correspond to a location and/or pattern of the smallest dots 416 of the cropped IR image 402*i*. During the downscaling process some of the IR data may be lost and/or changed. For example, the location and/or pattern of the downscaled dots 420-426 may not exactly match the location and/or pattern of the dots 410-416.

The downscaled IR image 404 may comprise lost data 428 and/or merged dots 430. In the example shown, the lost data 428 may correspond to a location of one of the smallest dots 416 of the cropped IR image 402*i*. The lost data 428 may represent locations that no longer have a dot from the structured light pattern SLP after downscaling. In the example shown, the merged data 430 may be a larger sized dot at a location that corresponds to more than one of the smallest dots 416 of the cropped IR image 402*i* (or the original full resolution IR image 370*i*). The merged data 430 may represent locations where multiple data points (e.g., dots) that may be located close together that have been misinterpreted as a larger sized dot. Generally, the lost data and/or merged data may correspond to the smallest sized dots. However, the dot pattern for various distances from the lens 160 may be misinterpreted during the downscaling process (e.g., one of the largest dots 410 may be misinterpreted as a smaller sized dot, more than one of the large dots 412 may be merged together as a largest sized dot, etc.).

The lost data 428 and/or the merged data 430 may represent misinterpreted IR data during the downscaling process that may result in errors in the generation of the depth maps DIMAGES. Determining the scale ratio R may enable the apparatus 100 to limit the amount of data loss. The data loss may be limited such that the computational cost of generating the depth maps DIMAGES is reduced compared to generating the depth maps directly from the cropped IR images 402*a*-402*k* (or the full-sized IR images 370*a*-370*k*) while still providing sufficient data to enable post-processing techniques to be performed.

The image used for downscaling may be the cropped IR images 402*a*-402*k* (or the full resolution IR images 370*a*-370*k* if no cropping is performed) comprising the exposed structured light dot pattern. After the downscale operation, the details of structured light pattern may be decreased along with the dimensions and/or scale of the image. The loss of detail from the downscaling may comprise a total number of pixels, a size and/or pattern of the dots captured, and the accuracy of the feature points.

The reduction of the total number of pixels in the downscaled IR image 404 may not be a disadvantage because the loss of total number of pixels may result in a faster calculation. The loss of total number of pixels may be desirable to provide a smaller number of dots in the structured light pattern. Fewer dots in the downscaled IR image 404 may result in faster depth map generation compared to using the cropped IR image 402*i* (or the full resolution IR image 370*i*). When there is excessive depth map information (e.g., more structured light data points than necessary for successful performance of the post-processing technique), the scale ratio R may be calculated to ensure the required (e.g., sufficient) number of depth resolution is calculated to provide a target face depth density by controlling the scale factor and/or position of the face area.

The loss of the size and/or pattern of the dots captured after downscaling may result in an increased difficulty in performing matching techniques on the dot pattern between the real time video frames 302*a*-302*n* to the reference images 304. After downscaling, some of the dots of the structured light pattern SLP may become blurred and/or merged into one. Instead of a direct pixel comparison between downscaled real time images 404 and the reference images 304, alternate comparison techniques may be implemented. In an example, a block match technique may be implemented to generate the depth maps DIMAGES from the downscaled images (e.g., both the real time cropped IR images 402*a*-402*k* and the reference images 304 may be downscaled).

The reduction in accuracy of the feature points may result from the reduction of resolution of the structured light pattern. The density of the depth info calculated by the depth map generation module 322 may be reduced by the same ratio. The downscaling process may be performed on the closest objects (e.g., the close face 260 and not the background face 262 as shown in the video frame 250). The closer the object distance is to the lens 160, the larger disparity and higher density on the depth information may be generated for the object. The greater amount of disparity and density of the depth information for close objects may offset the loss in accuracy. For example, the compensation may result in an accuracy that may be comparable to an accuracy of results for the small faces (e.g., faces at a far distance) on the original real time image. The tolerance parameter TOL may enable a user to tune whether the depth maps are generated with more accuracy or with a faster calculation speed.

Figure 9:
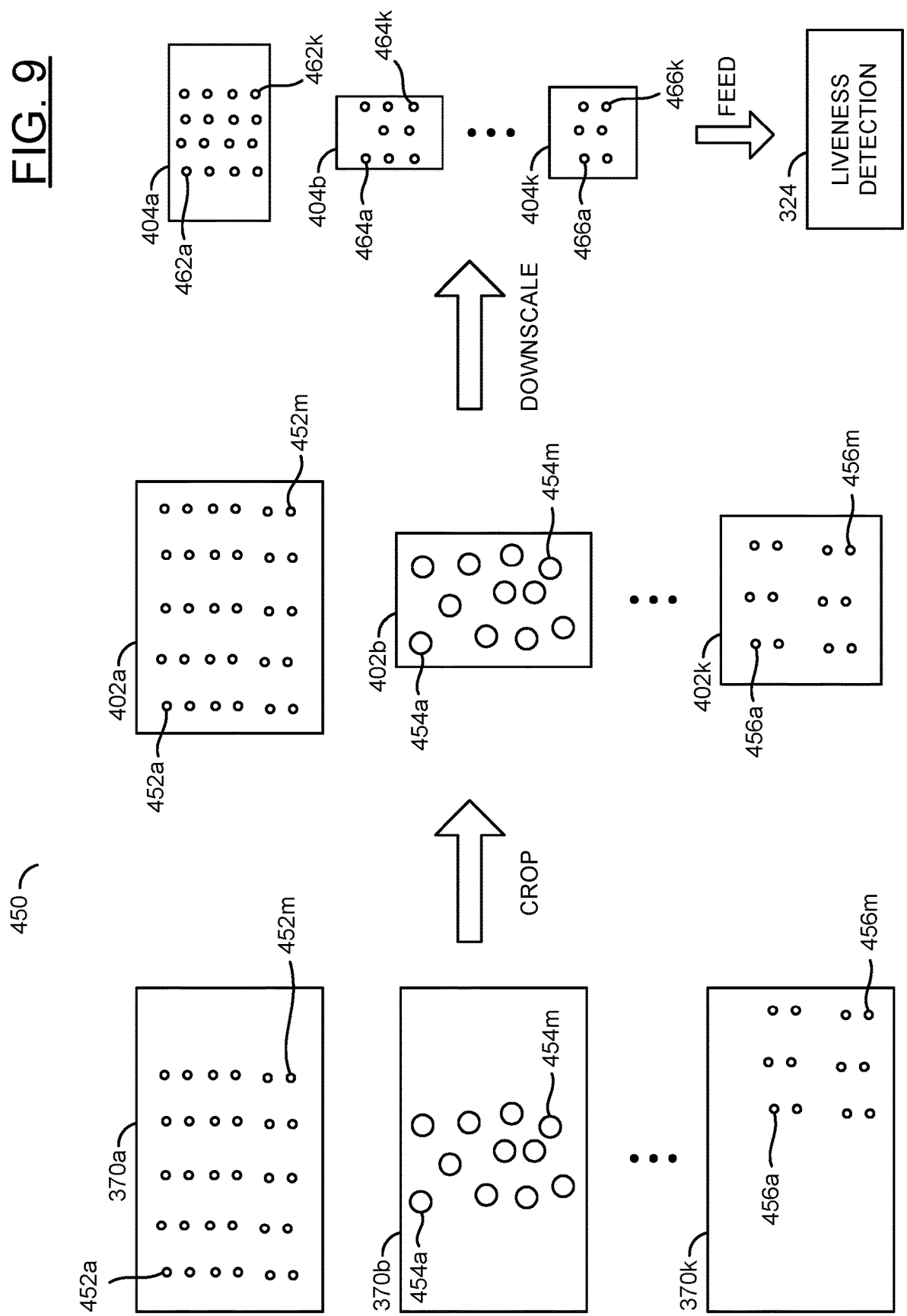
FIG. 9 is a diagram illustrating downscaling IR video frames.

Referring to FIG. 9, a diagram illustrating downscaling IR video frames is shown. Data processing 450 of the IR images 370*a*-370*k* are shown. The data processing 450 may illustrate how different sizes of regions of interest of the face data are handled by the processor 102. The data processing 450 may comprise the full resolution IR images 370*a*-370*k*, the cropped IR images 402*a*-402*k*, the downscaled IR images 404*a*-404*k* and the post-processing module 324.

The full resolution IR images 370*a*-370*k*, may comprise IR images having a consistent resolution and/or aspect ratio (e.g., the resolution and/or aspect ratio of the RGB-IR sensor 180). In the example shown, the full resolution IR images 370*a*-370*k*, may comprise an IR image having a rectangular resolution in a landscape orientation (e.g., 3840×2160, 1920×1080, 640×480, etc.). The full resolution IR image 370*a* may comprise structured light dots 452*a*-452*m* corresponding to a face (other dots may be captured but are not shown for illustrative purposes). In the example shown, the structured light dots 452*a*-452*m* are shown mostly on a left side of the full resolution IR image 370*a*. The full resolution IR image 370*b* may comprise structured light dots 454*a*-454*m* corresponding to a face (other dots may be captured but are not shown for illustrative purposes). In the example shown, the structured light dots 454*a*-454*m* are shown mostly on a middle section of the full resolution IR image 370*b*. The full resolution IR image 370*k* may comprise structured light dots 456*a*-456*m* corresponding to a face (other dots may be captured but are not shown for illustrative purposes). In the example shown, the structured light dots 456*a*-456*m* are shown mostly on a bottom right side of the full resolution IR image 370*k*. The size, resolution and/or dot patterns of the IR images 370*a*-370*k* may be varied according to the design criteria of a particular implementation.

The cropping operation may be performed by the crop module 318. The cropped IR images 402*a*-402*k* may be generated by the crop module 318 in response to the full resolution IR images 370*a*-370*k* based on the face data FDATA. The cropped IR images 402*a*-402*k* shown may correspond to the full resolution IR images 370*a*-370*k*, respectively.

The cropped IR images 402*a*-402*k* may comprise IR images having varying aspect ratios, resolutions and dot patterns. In the example shown, the cropped IR image 402*a* may comprise an IR image having a rectangular resolution in a landscape orientation (e.g., 3600×2160, 1400×1080, 500×480, etc.). The cropped IR image 402*a* may comprise the structured light dots 452*a*-452*m* from the full resolution IR image 370*a* that correspond to the location of the face, with other pixel data deleted and/or removed. The structured light dots 452*a*-452*m* are shown as a regular pattern of small dots as an illustrative example. In the example shown, the cropped IR image 402*b* may comprise an IR image having a rectangular shape in a portrait orientation (e.g., 1000×2000, 700×1000, 400×800, etc.). The cropped IR image 402b may comprise the structured light dots 454a-454m from the full resolution IR image 370b that correspond to the location of the face, with other pixel data deleted and/or removed. The structured light dots 454a-454m are shown as an irregular pattern of large dots as an illustrative example. In the example shown, the cropped IR image 402k may comprise an IR image having a square shape (e.g., 2000×2000, 1000×1000, 800×800, etc.). The cropped IR image 402k may comprise the structured light dots 456a-456m from the full resolution IR image 370k that correspond to the location of the face, with other pixel data deleted and/or removed. The structured light dots 456a-456m are shown as a regular pattern of small dots as an illustrative example.

The size of the face area in each of the full resolution IR images 370a-370k may be a variable size based on a distance of a person from the image sensor 180 that captures the pixel data used to generate the video frames 302a-302n. The variable size of the face area may result in each of the cropped IR images 402a-402k having various aspect ratios, resolutions and/or dot patterns.

The downscaling operation may be performed by the downscale module 320. The downscaled IR images 404a-404k may be generated by the downscale module 320 in response to the cropped IR images 402a-402k based on the scale ratio R. The downscaled IR images 404a-404k shown may correspond to the cropped IR images 402a-402k (and the full resolution IR images 370a-370k), respectively.

After the downscaling operation, the output downscaled IR images 404a-404k may have a reduced resolution and scale from the input IR images 370a-370k. However, the aspect ratio of the output downscaled IR images 404a-404k may be similar (or slightly different from) the cropped IR images 402a-402k. The downscaling operation may keep the aspect ratio of the detected face the same as original aspect ratio of the face (e.g., measured from the face data FDATA) in the cropped IR images 402a-402k.

After the downscale process, the aspect ratio of the downscaled IR images 404a-404k may be the same as the cropped IR images 402a-402k, but with a reduced resolution. For example, the shape of each of the downscaled IR images 404a-404k may be different, which corresponds to different face shapes (e.g., aspect ratios) in the cropped IR images 402a-402k. In the example shown, the downscaled IR image 404a may have a same aspect ratio as the input cropped IR image 402a with a rectangular resolution in the landscape orientation but with a reduced resolution (e.g., from 3600×2160 down to 1400×1080, from 1400×1080 to 500×480, from 500×480 to 300×240, etc.). In the example shown, the downscaled IR image 404b may have a same aspect ratio as the input cropped IR image 402b with a rectangular resolution in the portrait orientation but with a reduced resolution (e.g., from 1000×2000 to 800×1600, from 700×1000 to 350×500, from 400×800 to 100×200, etc.). In the example shown, the downscaled IR image 404k may have a same aspect ratio as the input cropped IR image 402k with a square resolution but with a reduced resolution (e.g., from 2000×2000 to 1500×1500, from 1000×1000 to 500×500, from 800×800 to 100×100, etc.). The amount of downscaling performed may be varied according to the size of the face area, the number of depth pixels for the post-processing operations, etc.

The downscaling operation may reduce a size and/or amount of the dots of the structured light pattern. In the example shown, the downscaled IR image 404a may comprise a downscaled dot pattern 462a-462k, the downscaled IR image 404b may comprise a downscaled dot pattern 464a-464k and the downscaled IR image 404k may comprise the downscaled dot pattern 466a-466k. The structured light dots 452a-452m may be downscaled to the downscaled structured light dots 462a-462k, the structured light dots 454a-454m may be downscaled to the downscaled structured light dots 464a-464k, and the structured light dots 456a-456m may be downscaled to the downscaled structured light dots 466a-466k (e.g., fewer downscaled dots than in the original IR images). After the downscale, some small structured light dots may vanish or may be merged with others (e.g., data loss). The downscaled IR images 404a-404k may be presented to the post-processing module 324 as input for a post-processing technique (e.g., liveness detection).

The entire IR images 370a-370n may be cropped and then downscaled. The IR images may be cropped down to just the face area for liveness detection. Even with the data loss in the downscaled structured light dots, the liveness detection may not be affected because of the calculation of the scale ratio R. By applying cropping and then the adaptive scale ratio of the downscale, each face area may become the similar target depth resolution (e.g., similar total number of pixels but not exactly the same dimensions as each face may still have slightly different shapes and aspect ratio from the original images). The target face depth resolution after downscale may be similar. The resolution of the original IR images 370a-370n and the structured light dot patterns may not be limited. The cropping performed may be determined based on the offset values (e.g., LO1 and TO1) and the face dimensions (e.g., FW1 and FH1) as shown in association with FIG. 5.

Figure 10:
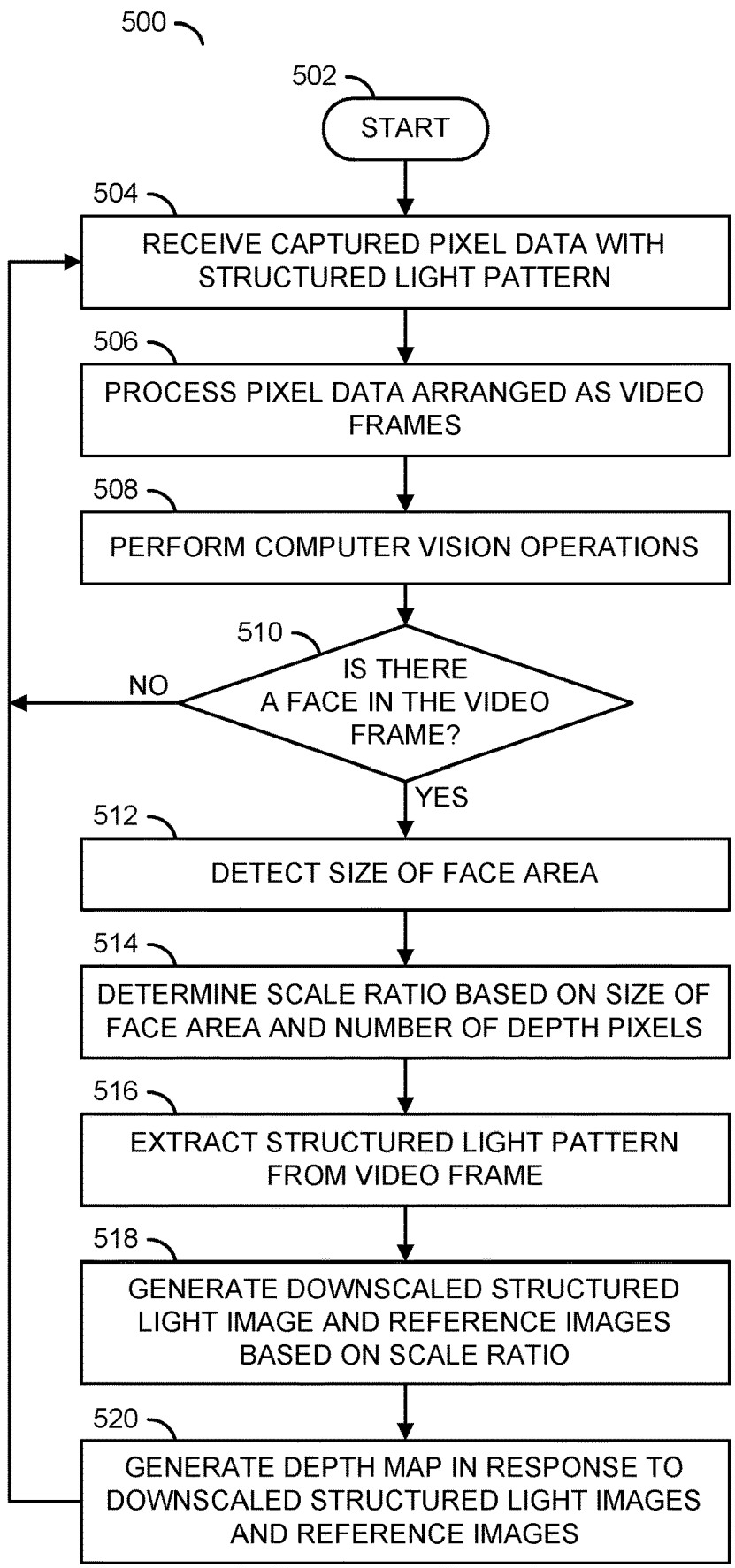
FIG. 10 is a flow diagram illustrating a method for generating adaptive face depth images.

Referring to FIG. 10, a method (or process) 500 is shown. The method 500 may generate adaptive face depth images. The method 500 generally comprises a step (or state) 502, a step (or state) 504, a step (or state) 506, a step (or state) 508, a decision step (or state) 510, a step (or state) 512, a step (or state) 514, a step (or state) 516, a step (or state) 518, and a step (or state) 520.

The step 502 may start the method 500. In the step 504, the processor 102 may receive the pixel data (e.g., the signal VIDEO) with the structured light pattern SLP. For example, the capture device 104 may generate the pixel data and the structured light projector 106 may activate and deactivate the structured light pattern SLP according to the predetermined timing of the signal SL_TRIG. For example, the video frames 302a-302n may comprise pixel data corresponding to when the structured light source 186 is active and other pixel data corresponding to when the structured light source 186 is turned off. Next, in the step 506, the processor 102 may process the pixel data arranged as video frames. In the step 508, the processor 102 may perform the computer vision operations on the video frames 302a-302n. Next, the method 500 may move to the decision step 510.

In the decision step 510, the CNN module 190b may determine whether or not there is a face captured in the video frames 302a-302n. In an example, the RGB extraction module 310 may extract the RGB channel 354 from the video frames 302a-302n to enable the face detection module 312 to perform face detection. If there is no face detected in the video frame, then the method 500 may return to the step 504. If there is a face detected in the video frame, then the method 500 may move to the step 510. In the step 510, the face detection module 312 may detect a size of the face area 270. The face detection module 312 may further detect an offset of the face area 270 in the video frame. Next, the method 500 may move to the step 514.

In the step 514, the scale ratio module 314 may determine the scale ratio R based on the size of the face area 270 (e.g., the dimensions FH1 and FW1), the tolerance value TOL and the number of depth pixels EXP for the post-processing technique. For example, the post-processing module 324 may provide the signal EXP that indicates the number of depth pixels. Next, in the step 516, the IR extraction module 316 may extract the structured light pattern (e.g., the dot pattern 360) and/or the IR images 370a-370k from the video frames 302a-302n. The crop module 318 may crop the full resolution IR images 370a-370k down to the cropped IR images 402a-402k based on the location and/or dimensions of the face in the signal FDATA. Next, the method 500 may move to the step 518.

In the step 518, the downscale module 320 may generate the downscaled IR images DLIMG (e.g., in response to the signal CIR) and the downscaled reference images DRIMG (e.g., in response to the reference images 304) based on the scale ratio R. Next, in the step 520, the depth map module 322 may generate the depth maps DIMAGES in response to the downscaled IR images DLIMG and the downscaled reference images DRIMG. The depth maps DIMAGES may be generated with a consistent face depth resolution (e.g., face depth density) and may be used for post-processing. Next, the method 500 may return to the step 504.

Figure 11:
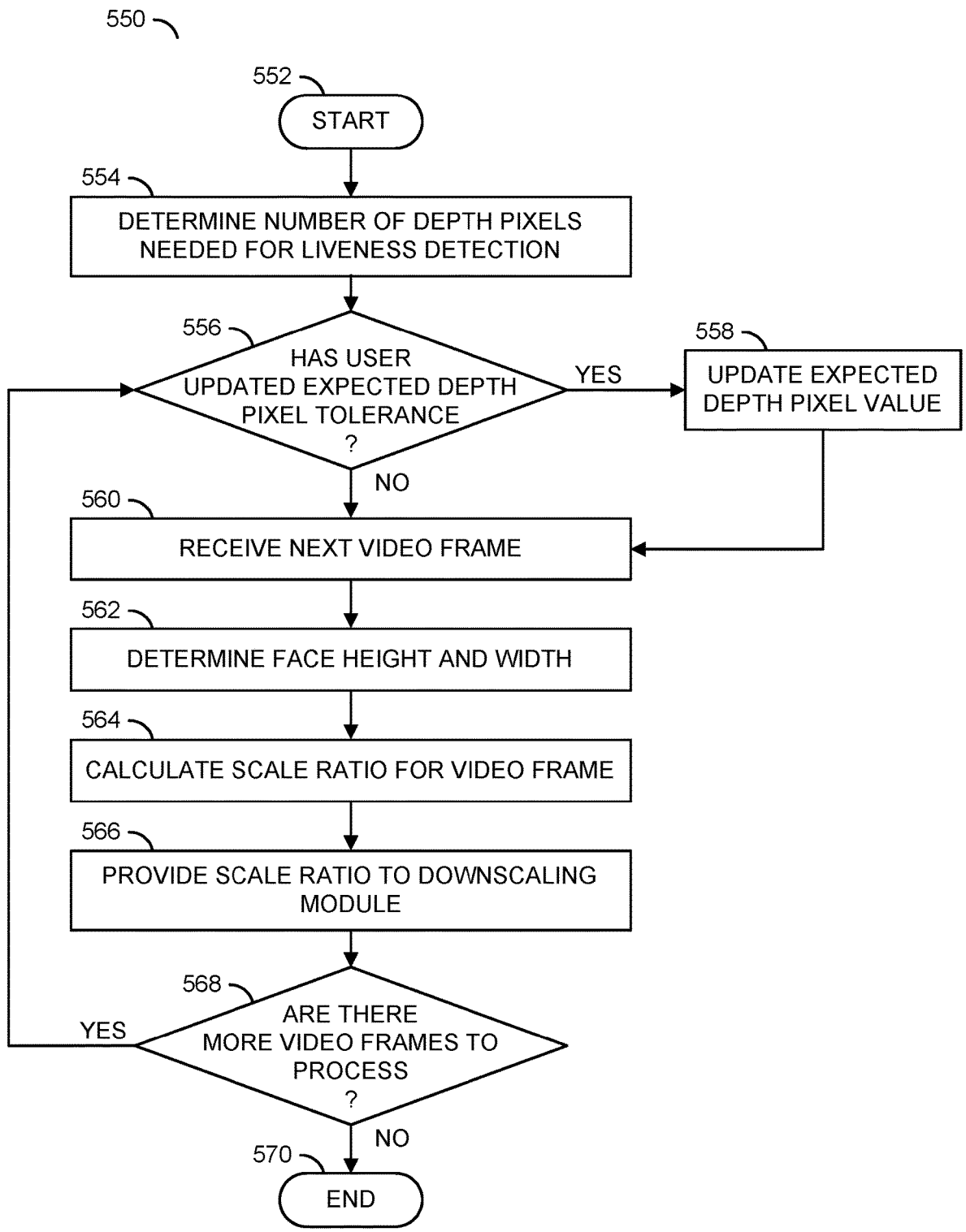
FIG. 11 is a flow diagram illustrating a method for determining a scale ratio for each video frame.

Referring to FIG. 11, a method (or process) 550 is shown. The method 550 may determine a scale ratio for each video frame. The method 550 generally comprises a step (or state) 552, a step (or state) 554, a decision step (or state) 556, a step (or state) 558, a step (or state) 560, a step (or state) 562, a step (or state) 564, a step (or state) 566, a decision step (or state) 568, and a step (or state) 570.

The step 552 may start the method 550. In the step 554, the scale ratio module 314 may determine a number of depth pixels needed for liveness detection in response to the signal EXP. Next, the method 550 may move to the decision step 556. In the decision step 556, the processor 102 may determine whether the user has updated the expected depth pixel tolerance. For example, the user may provide the input signal TOL to the apparatus 100 to adjust the tolerance value. Adjusting the tolerance value may enable a user to calibrate the downscaling between faster calculation time (e.g., less accuracy) and higher accuracy (e.g., slower calculation time) within a range of expected depth pixels. If the user has updated the tolerance value TOL, then the method 550 may move to the step 558. In the step 558, the processor 102 may update the expected depth pixel value. Next, the method 550 may move to the step 560. In the decision step 556, if the user has not updated the expected depth pixel tolerance, then the method 550 may move to the step 560 (e.g., continue using the previous expected depth pixel value).

In the step 560, the CNN module 190b may receive the next one of the video frames 302a-302n. Next, in the step 562, the RGB extraction module 310 may extract the RGB images 372a-372m from the video frames 302a-302n and then the face detection module 312 may determine a location of the faces (e.g., the offset values LO1/LO2 and TO1/TO2) and the height and width of the faces (e.g., the dimensions FW1/FW2 and FH1/FH2). In the step 564, the scale ratio module 314 may calculate the scale ratio R for the current video frame (e.g., based on the formula [1]). Next, in the step 566, the scale ratio module 314 may provide the scale ratio R to the downscale module 320. Next, the method 550 may move to the decision step 568.

In the decision step 568, the processor 102 may determine whether there are more of the video frames 302a-302n to process. The scale ratio R may be recalculated for each of the video frames 302a-302n. For example, as a person captured in the video frames 302a-302n moves in front of the capture device 104 (e.g., forward, backward, to the left, to the right, up, down, etc.) during the sequence of the video frames 302a-302n, the various characteristics of the face may be updated (e.g., the offset, the height, the width, etc.). The processor 102 may recalculate the scale ratio R in real-time for each of the video frames 302a-302n. If there are more of the video frames 302a-302n to process, then the method 550 may return to the decision step 556 (e.g., recalculate the scale ratio R for the next video frame). If there are no more of the video frames 302a-302n to process, then the method 550 may move to the step 570. The step 570 may end the method 550.

Figure 12:
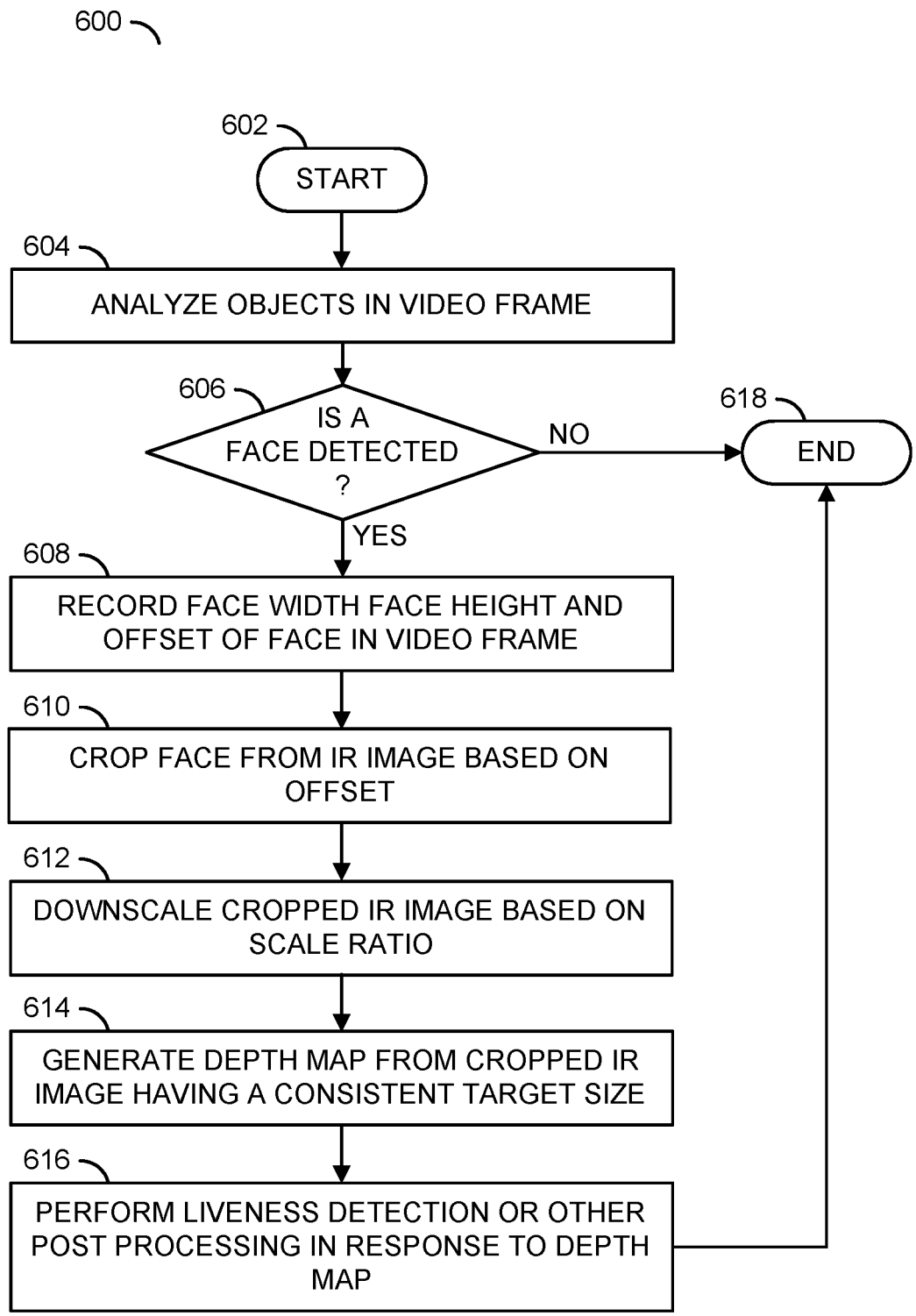
FIG. 12 is a flow diagram illustrating a method for performing post processing on depth maps having a consistent target size.

Referring to FIG. 12, a method (or process) 600 is shown. The method 600 may perform post processing on depth maps having a consistent target size. The method 600 generally comprises a step (or state) 602, a step (or state) 604, a decision step (or state) 606, a step (or state) 608, a step (or state) 610, a step (or state) 612, a step (or state) 614, a step (or state) 616, and a step (or state) 618.

The step 602 may start the method 600. In the step 604, the CNN module 190b may analyze the objects detected in the RGB images 372a-372m. Next, the method 600 may move to the decision step 606. In the decision step 606, the CNN module 190b may determine whether a face has been detected in the RGB images 372a-372m. For example, the CNN module 190b may perform the computer vision operations to detect objects and/or classify the objects detected to determine whether one or more faces are in the video frames. If no face has been detected, then the method 600 may move to the step 618. If a face has been detected, then the method 600 may move to the step 608.

In the step 608, the face detection module 312 may record a face width (e.g., FW1), a face height (e.g., FH1) and an offset (e.g., TO1 and LO1) of the face 260 detected in the video frame. Next, in the step 610, the crop module 318 may crop the face from the full resolution IR images 370a-370i based on the face data (e.g., FW1, FH1, TO1, LO1, etc.). In the step 612, the downscale module 320 may downscale the corresponding one of the cropped IR images 402a-402k (or one of the full resolution IR images 370a-370k if not cropping is implemented) based on the scale ratio R. Next, in the step 614, the depth map module 322 may generate the depth maps DIMAGES from one of the cropped downscaled IR images 404a-404k. The depth maps DIMAGES may have a consistent target size (e.g., face depth density) due to the downscaling and cropping. In the step 616, the post-processing module 324 may perform liveness detection and/or other post-processing operations on the downscaled depth maps DIMAGES. For example, the post-processing module 324 may generate the signal LIVEOUT comprising a result that indicates whether the face detected is a real face (e.g., a live human) or a fake face (e.g., a photo of a face). Next, the method 600 may move to the step 618. The step 618 may end the method 600.

Figure 13:
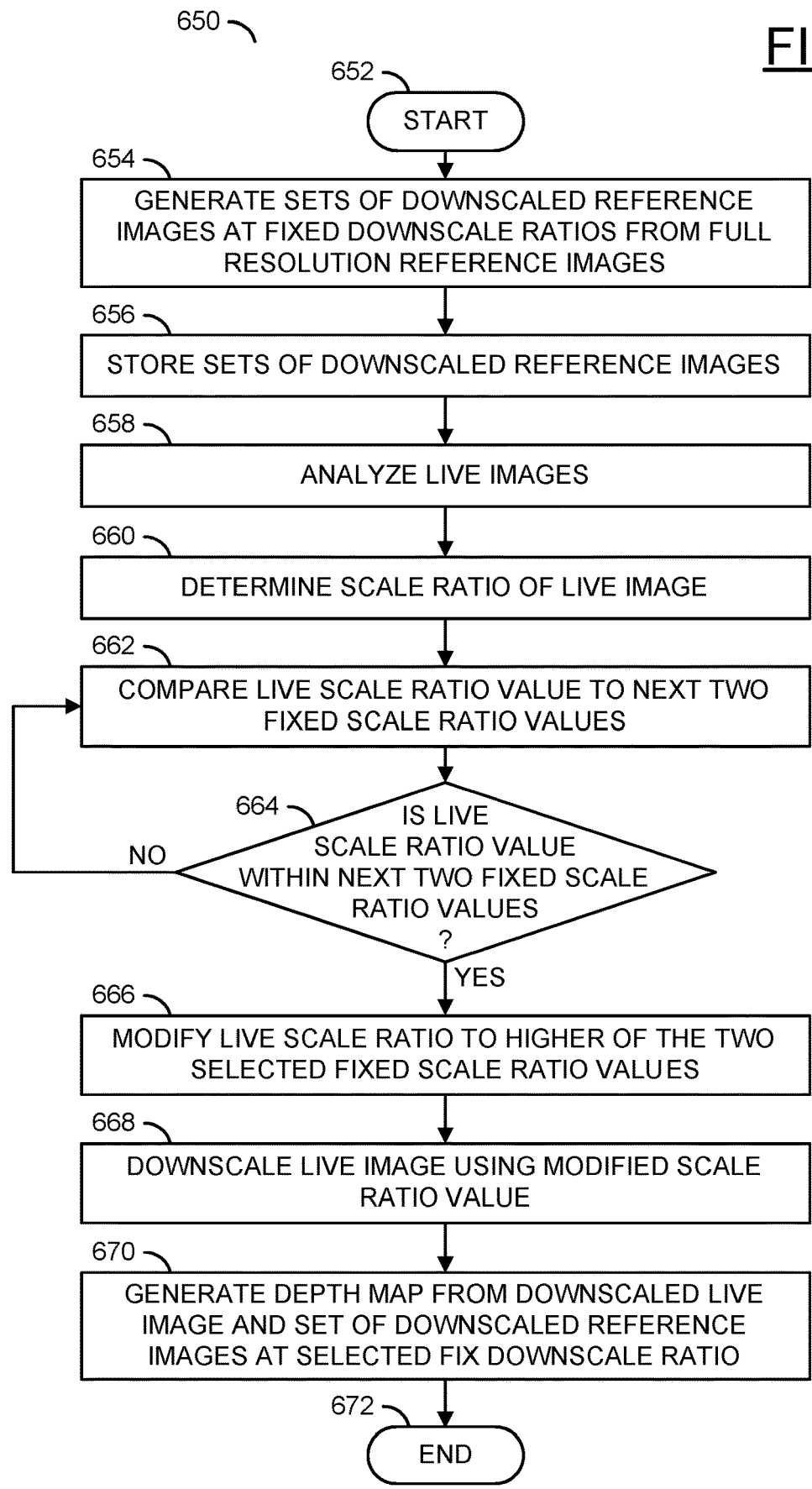
FIG. 13 is a flow diagram illustrating a method for precalculating downscaled reference images.

Referring to FIG. 13, a method (or process) 650 is shown. The method 650 may precalculate downscaled reference images. The method 650 generally comprises a step (or state) 652, a step (or state) 654, a step (or state) 656, a step (or state) 658, a step (or state) 660, a step (or state) 662, a decision step (or state) 664, a step (or state) 666, a step (or state) 668, a step (or state) 670, and a step (or state) 672.

The step 652 may start the method 650. In the step 654, the processor 102 and/or the CNN module 190b may generate sets of downscaled reference images at fixed downscale ratios in response to the full resolution reference images 304. The various sets of downscaled reference images may be generated before the live video frames 302a-302n are received. In an example, the fixed scale ratios may be 1/2, 1/4, 1/8, 1/16, etc. Next, in the step 656, the sets of downscaled reference images may be stored in the memory 150. Each set of reference images may be generated from the original full resolution reference images 304 based on one of the fixed scale ratios. Storing the sets of downscaled reference images in advance of receiving the live video frames 302a-302n may provide faster calculation time (e.g., compared to generating a downscaled reference image in real time using the calculated scale ratio R from the live input video frame). Storing the sets of downscaled reference images in advance may have a cost of memory storage requirements (e.g., additional memory storage is used to store the sets of downscaled reference images). Next, the method 650 may move to the step 658.

In the step 658, the processor 102 and/or the CNN module 190b may analyze the live input video frames 302a-302 (e.g., detect the face areas, extract the RGB and IR images, etc.). Next, in the step 660, the scale ratio module 314 may calculate the live scale ratio R in response to the input RGB image 372i, the size of the face area, the expected number of depth pixels and/or the tolerance value. In the step 662, the processor 102 may compare the live scale ratio value R to a next two of the fixed scale ratio values. For example, if the fixed scale ratio values are 1, 1/2, 1/4, 1/8, etc., then a first comparison may be between the calculated scale ratio R and 1 and 1/2, a second comparison may be between the calculated scale ratio R and 1/2 and 1/4, a third comparison may be between the calculated scale ratio R and 1/4 and 1/8, etc. Next, the method 650 may move to the decision step 664.

In the decision step 664, the processor 102 may determine whether the live scale ratio value R is within the two fixed scale ratio values. For example, the processor 102 may determine whether ratio_p0>=R>ratio_p1, where ratio_p0 and the ratio_p1 are the two fixed scale ratios and R is the live scale ratio. If the live scale ratio is not within the next two fixed scale ratio values, then the method 650 may return to the step 662 and the comparison may be performed again (e.g., using ratio_p1 and ratio_p2, then using ratio_p2 and ratio_p3, etc.). If the live scale ratio is within the next two fixed scale ratio values, then the method 650 may move to the step 666.

In the step 666, the processor 102 may modify the live scale ratio value R to the higher of the two selected fixed scale ratio values (e.g., if R is within ratio_p0 and ratio_p1, then R may be modified to the same value as ratio_p0, if R is within ratio_p1 and ratio_p2, then R may be modified to ratio_p1, etc.). In an example, if the live scale ratio R is 1/1.5 and ratio_p0 is 1 and ratio_p1 is 1/2, then the live scale ratio R may be modified to be 1. In another example, if the live scale ratio R is 1/3 and ratio_p1 is 1/2 and ratio_p2 is 1/4, then the live scale ratio R may be modified to be 1/2. Next, in the step 668, the downscale module 320 may downscale the cropped IR image 402i using the modified scale ratio value. In the step 670, the depth map module 322 may generate the depth map DIMAGES from the downscaled live image DLIMG and the set of downscaled reference images DRIMG at the selected downscale ratio. For example, the downscale module 320 may downscale the cropped IR image 402i using the modified live scale ratio value and the memory 150 may provide the downscaled reference image from the set of downscaled reference images that corresponds to the modified live scale ratio value. Next, the method 650 may move to the step 672. The step 672 may end the method 650.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data;
a structured light projector configured to generate a structured light pattern; and
a processor configured to (i) process said pixel data arranged as video frames comprising said structured light pattern, (ii) perform computer vision operations on said video frames to detect a size of a face area of said video frames, (iii) determine a scale ratio in response to said size of said face area, (iv) extract said structured light pattern from said video frames, and (v) generate a downscaled structured light image, wherein
(i) a downscale operation is performed in response to said scale ratio and said structured light pattern to generate said downscaled structured light image, and
(ii) said scale ratio is calculated to enable said downscaled structured light image to maintain depth features of said structured light pattern in said downscaled structured light image that are used for a post-processing operation.

2. The apparatus according to claim 1, wherein said downscaled structured light image is generated with a number of depth pixels to prevent a block match failure using said downscaled structured light image.

3. The apparatus according to claim 1, wherein said depth features maintained in said downscaled structured light image provide an expected range of a depth pixel number for said post-processing operation that comprises a liveness detection operation.

4. The apparatus according to claim 1, wherein said downscale operation is performed to reduce a number of calculations performed by said processor to generate a depth map using said downscaled structured light image and a downscaled reference image compared to a second number of calculations performed for generating said depth map from said structured light pattern from said video frames.

5. The apparatus according to claim 1, wherein (i) a downscaled reference image is generated in response to said downscale operation performed on a plurality of reference images, (ii) said plurality of reference images are precalculated at fixed downscale ratios and (iii) said processor is further configured to (a) compare said scale ratio to said fixed downscale ratios, (b) modify said scale ratio to match one of said fixed downscale ratios and (c) generate a depth map in response to said downscaled structured light image and said downscaled reference image.

6. The apparatus according to claim 1, wherein said processor is configured to implement an adaptive generation of face depth maps.

7. The apparatus according to claim 1, wherein determining said scale ratio enables a depth map to be dynamically created in response to said downscaled structured light image and a downscaled reference image at a range of resolutions that correspond to said size of said face area.

8. The apparatus according to claim 1, wherein (i) said processor is configured to perform face detection operations on said video frames to determine said size of said face area and (ii) said face detection operations (a) determine whether at least one face is captured by said video frames and (b) record an offset and said size of said face area if said at least one face is detected.

9. The apparatus according to claim 1, wherein (i) said scale ratio is calculated in response to a number of depth pixels for said post-processing operation, said size of said face area and a tolerance parameter and (ii) said size of said face area comprises a face width and a face height.

10. The apparatus according to claim 9, wherein (i) said tolerance parameter is a configurable value set by a user and (ii) said tolerance parameter enables said user to adjust said downscale operation between a detection accuracy and a calculation speed.

11. The apparatus according to claim 9, wherein said scale ratio is a smaller value when said size of said face area is large.

12. The apparatus according to claim 1, wherein an amount of time added to perform calculations for said downscale operation is less than a time difference to perform depth calculations to generate a depth map in response to said downscaled structured light image and a downscaled reference image compared to said depth calculations to generate said depth map in response to said structured light pattern and a full resolution reference image.

13. The apparatus according to claim 1, wherein a depth map generated in response to said downscaled structured light image and a downscaled reference image has a consistent face depth resolution.

14. The apparatus according to claim 1, wherein said downscaled structured light image has (i) a lower resolution than said structured light pattern and (ii) a same aspect ratio as said structured light pattern after a cropping operation.

15. The apparatus according to claim 1, wherein (i) said face area is detected by performing said computer vision operations on an RGB subset of said video frames that have been captured when said structured light projector is not generating said structured light pattern and (ii) said downscaled structured light image is generated in response to an IR subset of said video frames that have been captured when said structured light projector is generating said structured light pattern.

16. The apparatus according to claim 15, wherein said scale ratio is determined for each of said video frames in said RGB subset of said video frames in real time in order to adapt to a change in characteristics of said face area as a person moves in front of a capture device that is generating said pixel data.

17. An apparatus comprising:
an interface configured to receive pixel data;
a structured light projector configured to generate a structured light pattern; and
a processor configured to (i) process said pixel data arranged as video frames comprising said structured light pattern, (ii) perform computer vision operations on said video frames to detect a size of a face area of said video frames, (iii) determine a scale ratio in response to said size of said face area, (iv) extract said structured light pattern from said video frames, (v) generate a downscaled structured light image and (vi) generate a depth map in response to said downscaled structured light image and a downscaled reference image, wherein
(i) a downscale operation is performed in response to said scale ratio and said structured light pattern to generate said downscaled structured light image,
(ii) said scale ratio is calculated to enable said downscaled structured light image to be generated with a sufficient number of depth pixels, and
(iii) said depth map generated in response to said downscaled structured light image and said downscaled reference image has a consistent face depth resolution.

18. The apparatus according to claim 17, wherein said consistent face depth resolution of said depth map reduces complexity for a post processing operation.

19. The apparatus according to claim 18, wherein (i) said post processing operation comprises a liveness detection and (ii) said consistent face depth resolution enables said liveness detection to be trained for a face depth with said consistent face depth resolution instead of face depths for multiple resolutions.

20. An apparatus comprising:
an interface configured to receive pixel data;
a structured light projector configured to generate a structured light pattern; and
a processor configured to (i) process said pixel data arranged as video frames comprising said structured light pattern, (ii) perform computer vision operations on said video frames to detect a size of a face area of said video frames, (iii) determine a scale ratio in response to said size of said face area, (iv) extract said structured light pattern from said video frames, (v) generate a downscaled structured light image and (vi) generate a depth map in response to said downscaled structured light image and a downscaled reference image, wherein
(i) a downscale operation is performed in response to said scale ratio and said structured light pattern to generate said downscaled structured light image,
(ii) said scale ratio is calculated to enable said downscaled structured light image to be generated with a sufficient number of depth pixels,
(iii) said downscaled reference image is generated in response to said downscale operation performed on a plurality of reference images,
(iv) said plurality of reference images are precalculated at fixed downscale ratios, and
(v) said processor is further configured to (a) compare said scale ratio to said fixed downscale ratios and (b) modify said scale ratio to match one of said fixed downscale ratios.

* * * * *